US006943779B2

(12) United States Patent
Satoh

(10) Patent No.: US 6,943,779 B2
(45) Date of Patent: Sep. 13, 2005

(54) INFORMATION INPUT/OUTPUT APPARATUS, INFORMATION INPUT/OUTPUT CONTROL METHOD, AND COMPUTER PRODUCT

(75) Inventor: Mitsuru Satoh, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 316 days.

(21) Appl. No.: 10/103,964

(22) Filed: Mar. 25, 2002

(65) Prior Publication Data

US 2002/0145595 A1 Oct. 10, 2002

(30) Foreign Application Priority Data

Mar. 26, 2001 (JP) ........................................ 2001-088921

(51) Int. Cl.[7] ................................................ G09G 5/00
(52) U.S. Cl. ...................... 345/173; 345/175; 178/18.01
(58) Field of Search ................................ 345/158–160, 345/173, 177, 169, 179, 87, 156, 157, 162, 165, 166, 174, 175; 178/18.01–18, 19.01–20, 18.03, 18.04, 18.09, 20.01

(56) References Cited

U.S. PATENT DOCUMENTS 4,914,624 A * 4/1990 Dunthorn ................... 345/173
5,589,856 A * 12/1996 Stein et al. ................. 345/173
5,825,352 A * 10/1998 Bisset et al. ................ 345/173
5,933,134 A * 8/1999 Shieh .......................... 345/173
5,943,043 A * 8/1999 Furuhata et al. ............ 345/173
6,040,824 A * 3/2000 Maekawa et al. ........... 345/173
6,229,529 B1 * 5/2001 Yano et al. .................. 345/175

FOREIGN PATENT DOCUMENTS

| JP | 10-091384 | 4/1998 |
| JP | 11-119965 | 4/1999 |
| JP | 3043632 | 3/2000 |

* cited by examiner

Primary Examiner—Amare Mengistu
Assistant Examiner—Mansour M. Said
(74) Attorney, Agent, or Firm—Oblon, Spivak, McClelland, Maier & Neustadt, P.C.

(57) ABSTRACT

Comprises a panel, and a coordinate control section that detects a point touched on the panel and generates a signal according to the detected point. The coordinate control section generates a coordinate signal that shows coordinates of a touched point, when one point touch on the panel has been detected. When simultaneous touches of two or more points on the panel has been detected, the coordinate control section generates a control that shows a control set in advance corresponding to the number of touched points.

24 Claims, 26 Drawing Sheets

SIMULTANEOUS TOUCH DETECTION DIAGRAM

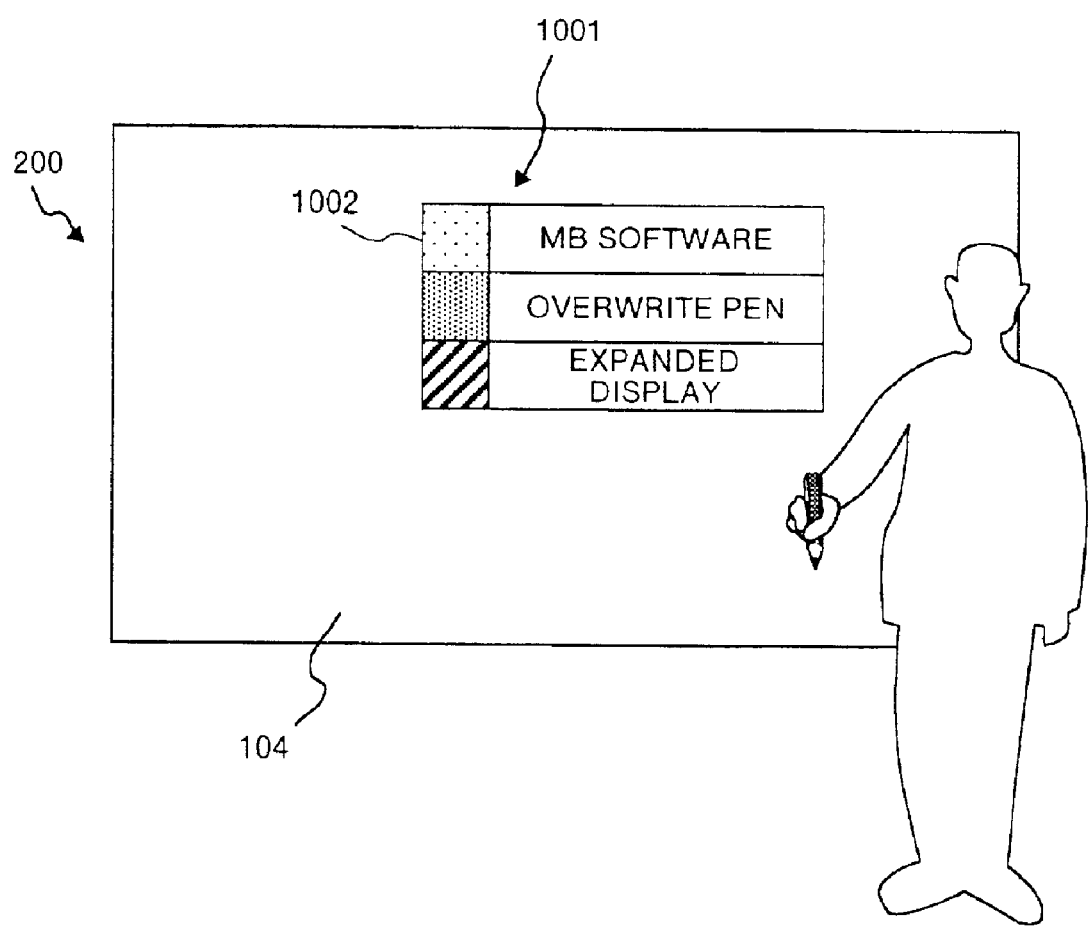

FIG.11A

SIMULTANEOUS TOUCH FUNCTION — 1103

| | | | |
|---|---|---|---|
| 1○ (1101) | ▫ (1102) | MB SOFTWARE (1107) | SET (1108/1112) |
| 2○ | ▨ | OVERWRITE PEN | DELETE — 1113 |
| 3○ | ▨ | EXPANDED DISPLAY (1109) | |
| 4○ | ☐ | (1110) | FORWARD — 1114 |
| 5● | ☐ | | BACKWARD — 1115 |

OK (1116)    CANCEL — 1117

FIG.11B

REGISTRATION OF SIMULTANEOUS TOUCH FUNCTION

NAME    MB SOFTWARE — 1121    PREVIEW ▨ — 1124

FILE    C:¥AAAA¥BBB.exe — 1122

BUTTON    ▪ — 1123    REFERENCE — 1125

OK (1126)    CANCEL — 1127

FIG.11C

FILE

SEARCH DESTINATION    My Document — 1131

■ BBB    — 1132    OPEN — 1135
☐ AAAA      CANCEL — 1136

FILE NAME — 1133

FILE TYPE    ALL(*.*) — 1134

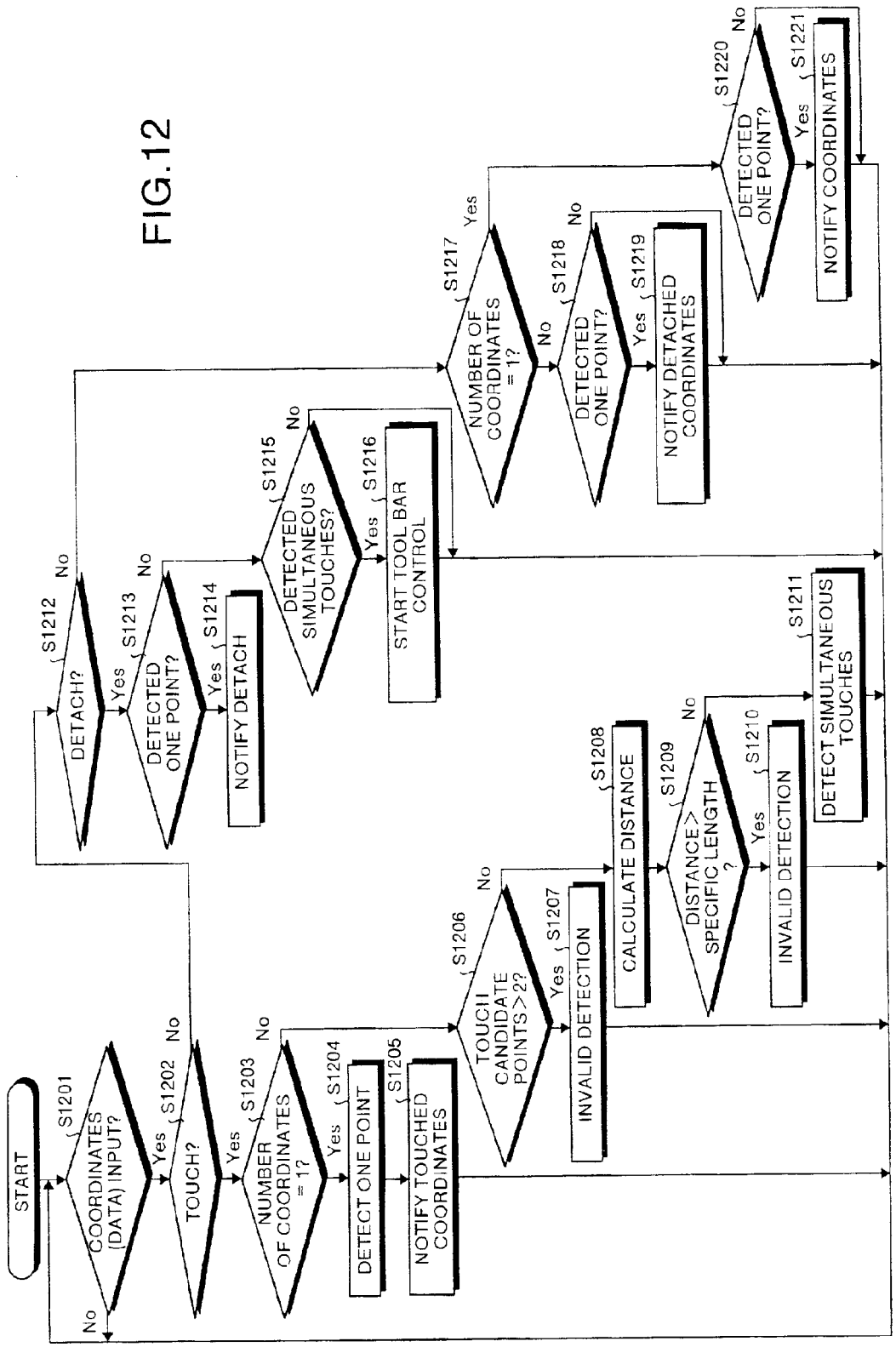

FIG.16A

```
SETTING OF MULTI-POINT TOUCH FUNCTION          ~1604
```

| | | |
|---|---|---|
| THREE POINTS ○ | [_____] | SET ~1605 |
| FOUR POINTS ○ | [_____] | DELETE ~1606 |
| FIVE POINTS ○ | [_____] | |
| SIX POINTS ○ | [_____] | |
| SEVEN POINTS ○ | [_____] | |
| EIGHT POINTS ○ | [_____] | |
| NINE POINTS ● | [_____] | |
| TEN POINTS ○ | [_____] | |

1601

1607 OK    CANCEL ~1608

FIG.16B

REGISTRATION OF SIMULTANEOUS TOUCH FUNCTION

NAME  [MB SOFTWARE]  ~1609
FILE  [C:¥AAAA¥BBB.exe]  ~1610   REFERENCE ~1611

1612~ OK    CANCEL ~1613

FIG.16C

FILE

SEARCH DESTINATION  [My Documents]  ~1614

1615~ ■ BBB       OPEN ~1618
      □ AAAA     CANCEL ~1619

FILE NAME  [_____] ~1616
FILE TYPE  [ALL(*.*)] ~1617

| OPERATION DIRECTION ANGLE | △x | △y | △y/△x | |
|---|---|---|---|---|
| 0 | 0 | + | ∞ | (tan90°) |
| 10 | + | + | 5.671 | (tan80°) |
| 20 | + | + | 2.747 | (tan70°) |
| 30 | + | + | 1.732 | (tan60°) |
| 40 | + | + | 1.192 | (tan50°) |
| 50 | + | + | 0.839 | (tan40°) |
| 60 | + | + | 0.577 | (tan30°) |
| 70 | + | + | 0.364 | (tan20°) |
| 80 | + | + | 0.176 | (tan10°) |
| 90 | + | 0 | 0 | (tan0°) |
| 100 | + | − | 0.176 | (tan10°) |
| 110 | + | − | 0.364 | (tan20°) |
| 120 | + | − | 0.577 | (tan30°) |
| 130 | + | − | 0.839 | (tan40°) |
| 140 | + | − | 1.192 | (tan50°) |
| 150 | + | − | 1.732 | (tan60°) |
| 160 | + | − | 2.747 | (tan70°) |
| 170 | + | − | 5.671 | (tan80°) |
| 180 | 0 | − | ∞ | (tan90°) |
| 190 | − | − | 5.671 | (tan80°) |
| 200 | − | − | 2.747 | (tan70°) |
| 210 | − | − | 1.732 | (tan60°) |
| 220 | − | − | 1.192 | (tan50°) |
| 230 | − | − | 0.839 | (tan40°) |
| 240 | − | − | 0.577 | (tan30°) |
| 250 | − | − | 0.364 | (tan20°) |
| 260 | − | − | 0.176 | (tan10°) |
| 270 | − | 0 | 0 | (tan0°) |
| 280 | − | + | 0.176 | (tan10°) |
| 290 | − | + | 0.364 | (tan20°) |
| 300 | − | + | 0.577 | (tan30°) |
| 310 | − | + | 0.839 | (tan40°) |
| 320 | − | + | 1.192 | (tan50°) |
| 330 | − | + | 1.732 | (tan60°) |
| 340 | − | + | 2.747 | (tan70°) |
| 350 | − | + | 5.671 | (tan80°) |

TIME (PHOTOTRANSISTOR SCANNING TIME)

INFORMATION INPUT/OUTPUT APPARATUS, INFORMATION INPUT/OUTPUT CONTROL METHOD, AND COMPUTER PRODUCT

FIELD OF THE INVENTION

The present invention relates to an information input/output apparatus, an information input/output control method, a computer-readable recording medium recorded with a program for making a computer execute an information input/output control method, and a program for making the computer execute an information input/output control method.

BACKGROUND OF THE INVENTION

Nowadays, touch-panel type information input/output apparatuses that are used to operate a computer by touching a touch panel with fingers or an exclusive pen have been widely utilized. Further, in recent years, schools and companies have come to employ a method of proceeding with lectures or giving explanations at meetings by displaying documents and data prepared in advance, or internet screens or video reproduction screens, on a large monitor.

When a touch panel and a monitor are integrated together in the above information input/output apparatus, a person who makes presentation can operate the computer, change screens or process screens, by indicating the screens displayed on the monitor. To operate the computer having a large monitor based on the touch-panel system has advantages in that the attendants or listeners can easily understand the ongoing explanation linked with the contents of the screen currently displayed on the monitor. Further, the attendants can easily understand the progress of the explanation linked with smooth changes in the explained contents of the screen displayed on the monitor.

Some computer software generally used have a tool bar display function. A tool bar is advantageous in that it is easy to select a processing item or a function to be executed by the computer from among items currently displayed on the monitor. On the other hand, occupying a part of the screen for a display has a drawback in that this limits the space that can be used for the screen display.

As conventional techniques that solve the above drawback, there are inventions that are disclosed in Japanese Patent Application Laid-open (JP-A) No. 10-91384 and JP-A No. 11-119965, for example. According to the invention disclosed in JP-A No. 10-91384, a tool bar itself has buttons that are displayed in scroll to select a function. It is possible to display all buttons in one space in which one tool bar is displayed.

Further, according to the invention disclosed in JP-A No. 10-91384, a tool bar has a button that changes a display position of the tool bar to a corner of the window. It is possible to move the tool bar displayed at an upper portion of the screen of an application at the beginning, to a corner of the window. With this arrangement, it is possible to prevent the screen from becoming narrow due to the display of the tool bar.

Further, according to the invention disclosed in JP-A No. 11-119965, a tool bar is displayed in a three-dimensional shape, and buttons that are used to select functions are provided on each side of the three-dimensional tool bar. It is possible to select many function buttons around the tool bar displayed in three dimensions, by using one tool bar display area. According to the invention disclosed in JP-A No. 11-119965, the tool bar is displayed at an upper portion of the screen of an application.

In general, a screen having large sizes is used to make presentation to a large number of attendants at lectures or meetings (this kind of screen will hereinafter be called a large screen). When a large screen is used, a person who makes presentation cannot indicate the whole parts of the screen in standing at a constant position. Therefore, this person moves positions to indicate the contents displayed on the large screen to match the explanation.

However, when the tool bar is displayed at a predetermined position such as an upper portion of the screen or at a corner of the window on the large screen following the conventional technique, the speaker must move to a position of the tool each time when the tool bar is used. When the speaker moves frequently, this move gives a large load to the speaker, and this also gives an uncomfortable impression to the attendants as they cannot concentrate on the explanation.

Further, a large screen generally has large sizes in a vertical direction, and the upper end portion of the screen may be set higher than the height of the speaker. Therefore, when the tool bar is displayed at a predetermined position following the conventional method, there is a risk that the speaker cannot reach the tool bar and finds it difficult to handle the tool bar.

The conventional technique is based on the assumption that the tool bar is displayed. However, in general, it is possible to display or erase the tool bar. The speaker touches a set position on the screen to switch between the display and the erasing of the tool bar, according to the touch panel input. Therefore, when a large screen is used, the speaker must move from the current position to this set position to switch between the display and the erasing of the tool bar.

As one idea of solving the above inconveniences, it may be considered a method of allocating a computer processing function to either a click or double-click input operation in only the touch panel system. Based on this, a specific function may be started from an optional position. However, a relationship between a click, a double click, or a right click and a program is common to all OS (operating system). To allocate an operation that is common to the mouse operation to other processing in only the touch panel affects other programs. Therefore, this method is not desirable.

SUMMARY OF THE INVENTION

It is a first object of the present invention to provide an information input/output apparatus and an information input/output control method of enabling a speaker at an optional position to make a computer start processing executed by a computer such as a tool bar display or erasing operation. It is also an object of the invention to provide a computer-readable recording medium recorded with a program for making the computer execute an information input/output control method, and a program for making the computer execute an information input/output control method.

It is a second object of the present invention to provide an information input/output apparatus and an information input/output control method of not affecting other programs, and to provide a computer-readable recording medium recorded with a program for making the computer execute an information input/output control method, and a program for making the computer execute an information input/output control method.

It is a third object of the present invention to provide an information input/output apparatus and an information input/output control method of preventing the occurrence of inconveniences in a large-screen touch panel and further facilitating the operation of the large-screen touch panel, and to provide a computer-readable recording medium recorded with a program for making the computer execute an information input/output control method, and a program for making the computer execute an information input/output control method.

In order to achieve the above objects, according to a first aspect of the present invention, there is provided an information input/output apparatus comprising, a touch panel, a touch point detecting unit which detects a point touched on the touch panel, and a signal generating unit which generates a signal according to a point detected by the touch point detecting unit. When the touch point detecting unit has detected that one point has been touched on the touch panel within a predetermined period of time, the signal generating unit generates a coordinate signal that shows coordinates of the touched point. When the touch point detecting unit has detected that two or more points have been touched on the touch panel within a predetermined period of time, the signal generating unit generates a control signal that shows a control according to a computer set in advance corresponding to the number of touched points.

According to the first aspect of the invention, when two or more points have been touched within a predetermined period of time, it is possible to generate a control signal that shows a control set in advance corresponding to the number of touched points. Therefore, the operation of touching two or more points within a predetermined period of time can be set as the operation that generates a control signal eigen to a touch-system coordinate input.

Further, according to a second aspect of the invention, there is provided an information input/output control method comprising, a touch point detecting step of detecting a point touched on a touch panel, and a signal generating step of generating a coordinate signal that shows coordinates of a touched point when it has been detected at the touch point detecting step of one point being touched on the touch panel within a predetermined period of time, and of generating a control signal that shows a control set in advance corresponding to a number of touched points when it has been detected at the touch point detecting step that two or more points have been touched on the touch panel within a predetermined period of time.

According to the second aspect of the invention, when two or more points have been touched within a predetermined period of time, it is possible to generate a control signal that shows a control set in advance corresponding to the number of touched points. Therefore, the operation of touching two or more points within a predetermined period of time can be set as the operation that generates a control signal eigen to a touch-system coordinate input.

Further, according to a third aspect of the invention, there is provided a computer-readable recording medium that is recorded with a program for making a computer execute an information input/output control method. The recording medium is recorded with an information input/output control method comprising, a touch point detecting step of detecting a point touched on a predetermined area set in advance, and a signal generating step of generating a coordinate signal that shows coordinates of a touched point when it has been detected at the touch point detecting step of one point being touched on the predetermined area within a predetermined period of time, and of generating a control signal showing a control according to a computer set in advance corresponding to a number of touched points when it has been detected at the touch point detecting step that two or more points have been touched on the predetermined area within a predetermined period of time.

According to the third aspect of the invention, when two or more points have been touched within a predetermined period of time, it is possible to make the computer generate a control signal that shows a control set in advance corresponding to the number of touched points. Therefore, the operation of touching two or more points within a predetermined period of time can be set as the operation that generates a control signal eigen to a touch-system coordinate input.

Further, according to a fourth aspect of the invention, there is provided a program for making a computer execute an information input/output control method comprising, a touch point detecting step of detecting a point touched on a touch panel, and a signal generating step of generating a coordinate signal that shows coordinates of a touched point when it has been detected at the touch point detecting step of one point being touched on the touch panel within a predetermined period of time, and of generating a control signal showing a control according to a computer set in advance corresponding to a number of touched points when it has been detected at the touch point detecting step that two or more points have been touched on the touch panel within a predetermined period of time.

According to the fourth aspect of the invention, when two or more points have been touched within a predetermined period of time, it is possible to make the computer generate a control signal that shows a control set in advance corresponding to the number of touched points. Therefore, the operation of touching two or more points within a predetermined period of time can be set as the operation that generates a control signal eigen to a touch-system coordinate input.

Other objects and features of this invention will become understood from the following description with reference to the accompanying drawings.

BRIEF DESCRIPTION OF THE DRAWINGS

FIG. 10 is a diagram that explains an operation procedure of the information input/output apparatus according to the first embodiment;

FIGS. 11A to 11C are diagrams that explain a procedure of editing a tool bar according to the first embodiment;

FIG. 12 is a flowchart that explains a method of controlling an input of coordinates according to the first embodiment;

FIGS. 16A to 16C are diagrams that explain still another structure example of the information input/output apparatus according to the first embodiment. These diagrams show function setting screens that set a relationship between a number of touch points and a function allocated to the touch points;

DETAILED DESCRIPTIONS

Preferred embodiments of an information input/output apparatus, an information input/output control method, a computer-readable recording medium that is recorded with a program for making a computer execute an information input/output control method, and a program for making the computer execute an information input/output control method according to the present invention will be explained in detail below as a first to third embodiments with reference to the attached drawings.

(First Embodiment)

A first embodiment explains a structure of an example of an information input/output apparatus according to the present invention. The information input/output apparatus according to the first embodiment is structured as what is called an electronic blackboard system that comprises a relatively large display, and that can display data recorded on a recording medium such as a computer hard disk, a floppy disk, a CD (compact disk), or a DVD (digital versatile disk) onto this display, and edit the displayed information. The information input/output apparatus according to the first embodiment can input information based on a touch panel system. Further, the information input/output apparatus explained in the first embodiment includes structures that are common to other embodiments to be described later.

Figure 1:
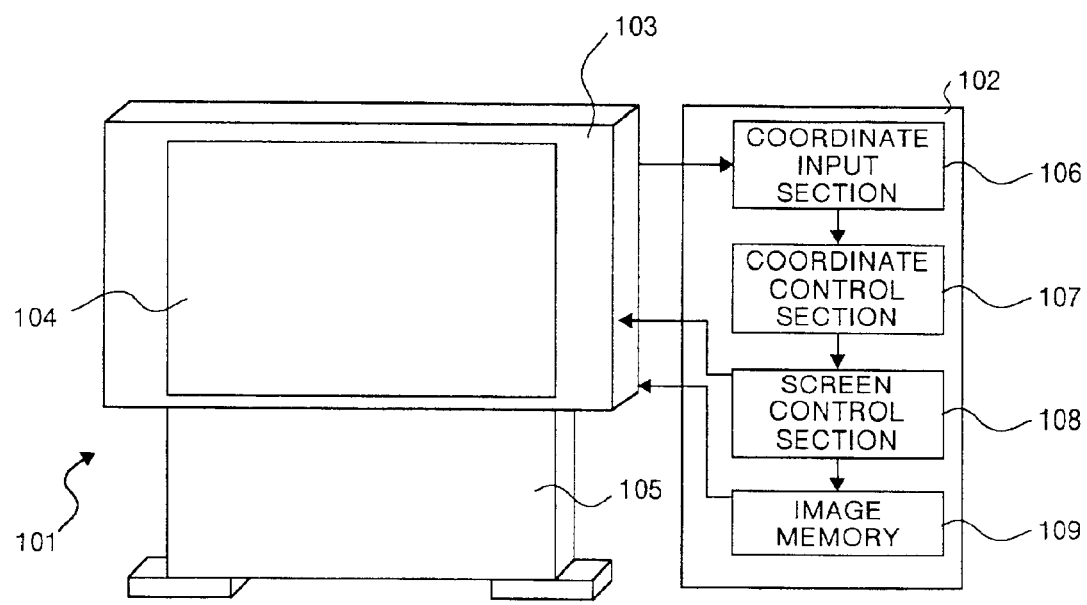
FIG. 1 is a diagram that shows the appearance of an information input/output apparatus that is common to embodiments of the present invention.

FIG. 1 is a diagram that shows the appearance of the information input/output apparatus according to the first embodiment. The information input/output apparatus shown in this diagram is constructed of a display section 101, and a computer that controls the display section 101. In the first embodiment, a general-purpose personal computer 102 is used for the computer. The information input/output apparatus has a program recorded with an information input/output control method to be described later, and this program is executed by the personal computer 102.

The display section 101 includes a display screen 104, a frame unit 103 that supports the display screen 104, and a supporting stand 105 that supports the display screen 104 and the frame unit 103. The display screen 104 is fitted with a coordinate input device to be described later. The display screen 104 and the coordinate input device constitute a touch panel having the display screen 104 and a panel that prescribes an area in which coordinates are input integrated together.

The personal computer 102 includes a coordinate input section 106 that receives coordinate data detected by a touch panel structured by the display screen 104 and the coordinate input device (hereinafter to be simply referred to as a touch panel), a coordinate control section 107 that calculates coordinates and generates a coordinate signal based on coordinate data received by the coordinate input section 106, or generates a control signal according to a number of points input to the touch panel shown by the coordinate data, a screen control section 108 that controls the display screen 104 based on the coordinate signal or the control signal generated by the screen control section 107, and an image memory 109 in which image data is expanded in the format of R, G and B. The image data expanded in the image memory 109 is output to the display screen 104 by a video output section not shown.

In the present embodiment, an operator's operation of inputting a point (coordinates) on the display screen 104 that constitutes the touch panel by touching this screen with a finger or a pen will be called a "touch". An input point will be called a "touch point". Touching a plurality of points on the screen within a predetermined period of time will hereinafter be called "simultaneous touches", and a plurality of points that have been touched simultaneously will be called "simultaneous touch points". The information input/output apparatus according to the first embodiment detects touch points at about every 20 ms. Therefore, in the first embodiment, when a plurality of points have been touched within one detection time of 20 ms, it s possible to regard these touches as simultaneous touches. However, in the first embodiment, to simplify the explanation, simultaneous touch points will be assumed always as two points.

The coordinate input section 106 is in the structure using a USB (universal serial bus) or RS232C (recommended standard 232-C), and outputs touch detection data from the touch panel to the coordinate control section 107. The coordinate control section 107 uses the detection data to calculate coordinates, and therefore, the detection data will be described as coordinate data.

The coordinate control section 107 decides whether simultaneous touches have been carried out or not, based on the input coordinate data. When coordinate data of only one coordinate point has been input within a predetermined period of time, the coordinate control section 107 decides that only one point has been touched on the touch panel. The coordinate control section 107 obtains the coordinates of this touched one point by calculation, and outputs the obtained coordinates to the screen control section 108 as a coordinate signal.

Figure 2:
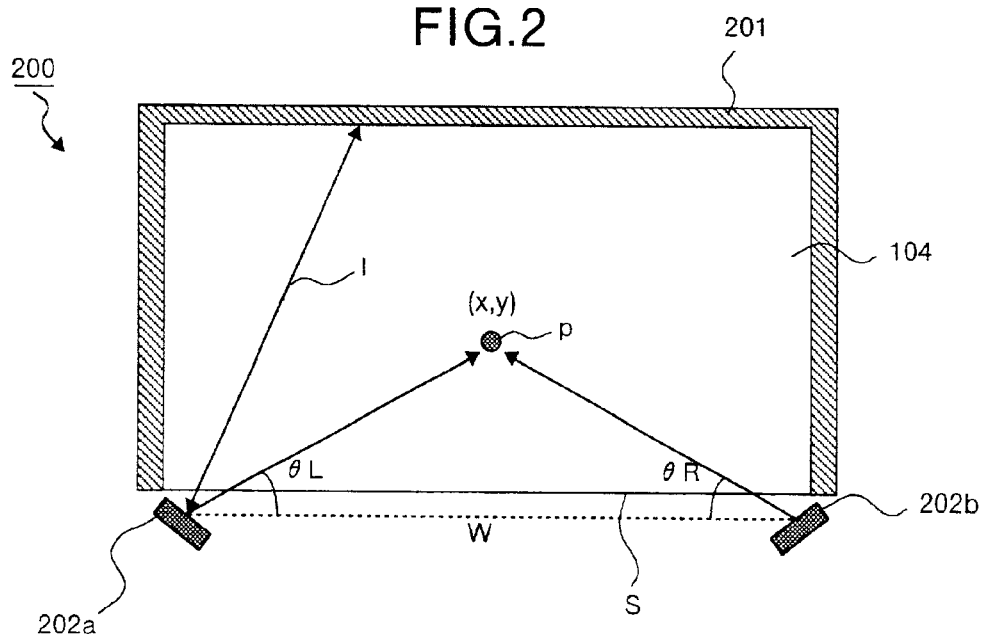
FIG. 2 is a diagram that explains a touch panel portion of the structure shown in FIG. 1.

The touch panel and the calculation carried out to obtain coordinates that are common to the embodiments of the present invention will be explained next. FIG. 2 is a diagram that schematically shows a touch panel 200 constructed of the coordinate input device and the display screen 104. The touch panel 200 is constructed of the display screen 104 that also functions as a panel, an optical reflection film 201 provided in three directions of the display screen 104, and optical units 202a and 202b. Of the touch panel components, the optical reflection film 201 and the optical units 202a and 202b constitute the coordinate input device.

The optical units 202a and 202b have similar structures. Each optical unit includes a light source (not shown) that irradiates fan-shaped laser beams forming a plane parallel with the display screen 104 on the whole area of the display screen 104, and a light receiving section (not shown) using a CCD (charge-coupled device) that receives reflection beams of the irradiated laser beams. The optical reflection film 201 is a retroreflection film that reflects a reflection beam to pass through the optical axis 1 again, when the beam passing through the optical axis 1 is reflected.

When a point p on the display screen 104 has been touched, a laser beam irradiated from the light source is interfered by a finger or a pen that has touched the point p. As a result, of the laser beam that passes through the touch point p, only the reflection beam that has been reflected from the optical reflection film 201 is not received by the light receiving section. Therefore, it is possible to understand the optical axis of the beam that passes through the touch point from the light receiving status of the light receiving element. Further, based on the provision of the two optical units 202a and 202b, it is possible to specify two optical axes that pass through the touch point p.

The coordinate control section 107 calculates coordinates (x, y) of the touch point p using the following expressions, based on angles θL and θL between a line parallel with a side s on which the optical units 202a and 202b are fitted in the touch panel and specified optical axes, and a distance W between the optical units 202a and 202b (for example, a distance between the light source of the optical unit 202a and the light source of the optical unit 202b). The calculated coordinates (x, y) are output to the screen control section 108.

$$x = W \cdot \tan \theta R \div (\tan \theta L + \tan \theta R) \quad (1)$$

$$y = W \cdot \tan \theta L \cdot \tan \theta R \div (\tan \theta L + \tan \theta R) \quad (2)$$

The coordinates (x, y) are set according to the resolution of the display screen 104 on the display screen 104. On the display screen 104 of the first embodiment, pixels of 1024 dots are disposed in the x-axis direction, and pixels of 708 dots are disposed in the y-axis direction. The x coordinate is set, for example, by using a light source position of the optical unit 202a as an origin, setting a maximum value to be set as the x coordinate to a pixel of the 1024-th dot position, and uniformly allocating a distance between the origin and the maximum value. Similarly, the y coordinate is set by setting a maximum value of the y coordinate to a pixel of the 708-th dot position, and uniformly allocating a distance between the origin and the maximum value.

Functions of click and double click are allocated in advance to specific coordinates of the display screen 104 of the touch panel onto which an input is carried out. The screen control section 108 decides whether obtained coordinates correspond to the coordinates on the display screen 104 to which these functions have been allocated or not. When the obtained coordinates correspond to the coordinates to which the functions have been allocated, the screen control section 108 executes the operation of click or double click.

When the screen control section 108 has decided that the coordinates input from the coordinate control section 107 do not correspond to the coordinates on the display screen 104 to which these functions have been allocated, the screen control section 108 writes a point into the coordinates obtained for the image data of the image memory, and outputs a result to the display screen 104. As a result, when coordinates not allocated with the functions are input continuously to the screen control section 108 from the coordinate control section 107, a line is drawn on the display screen 104.

When the coordinate control section 107 has decided that two points have been touched simultaneously on the touch panel, that is, when coordinate data of two coordinate points have been input within a predetermined period of time, the coordinate control section 107 generates a control signal showing a computer control that has been set in advance corresponding to a number of touched points (two points in the first embodiment), and outputs this control signal to the screen control section 108. In the first embodiment, this control signal is a control signal that instructs the screen control section 108 to display a tool bar. The screen control section 108 to which the control signal has been input starts a program for displaying the tool bar, and making the tool bar displayed on the display screen 104.

According to the first embodiment, in the information input/output apparatus that is operated using the touch panel, it is possible to carry out simultaneous touches as the operation of generating a control signal similar to click and double click at optional points on the display screen 104. Therefore, by allocating the control signal for the display of the tool bar to simultaneous touches, it becomes possible to display the tool bar without affecting other programs. The display of the tool bar makes it possible to directly execute the function shown in the tool bar on the displayed screen. Therefore, according to the first embodiment, it is not necessary to once close the screen on display and operate to make the tool bar displayed from other screen. As a result, it is possible to improve the operation the information input/output apparatus.

Further, the information input/output apparatus of the first embodiment carries out the following processing in order to make the tool bar displayed at a position relatively close to the simultaneously touched positions. That is, when simultaneous touches have been detected, the coordinate control section 107 obtains touch candidate points that have a possibility of being touched. The control signal is a signal that is displayed in an area encircled by straight lines that pass through the touch candidate points on the display screen 104.

Figure 3:
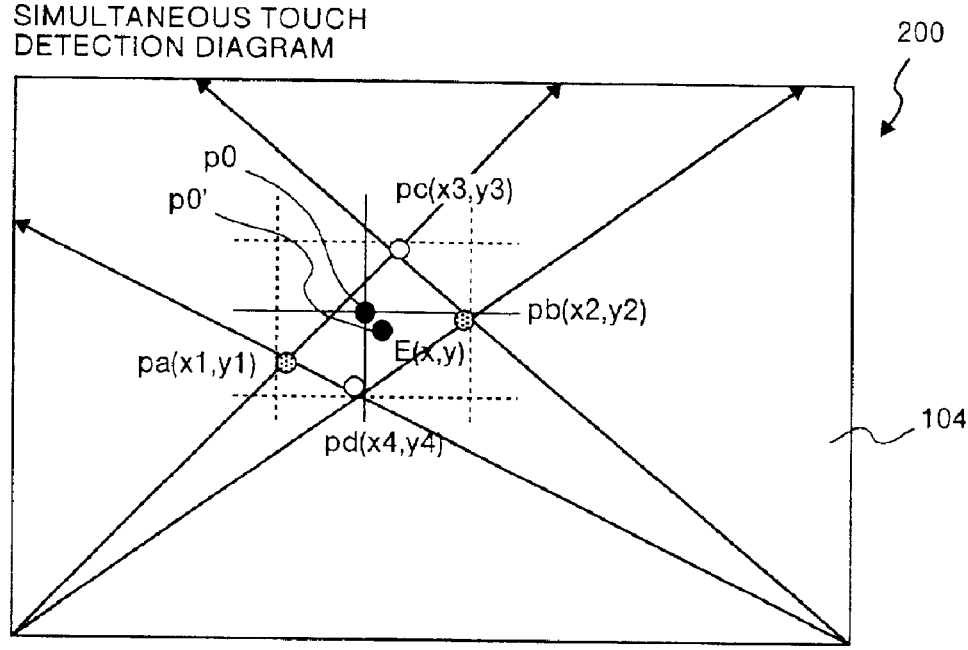
FIG. 3 is a diagram that explains a procedure of obtaining touch candidate points according to a first embodiment of the present invention.

FIG. 3 is a diagram that explains a procedure of obtaining touch candidate points. When simultaneous touches have been carried out, the coordinate control section 107 cannot decide which two points have been simultaneously touched among a point pa (x1, y1), a point pb (x2, y2), a point pc (x3, y3), and a point pd (x4, y4), from the data detected by the optical unit 202a (FIG. 1) and the optical unit 202b (FIG. 1). In this instance, the coordinate control section 107 calculates the coordinates of all the points of the point pa (x1, y1), the point pb (x2, y2), the point pc (x3, y3), and the point pd (x4, y4), as touch candidate points that have a possibility of being simultaneously touches. In the first embodiment, the above equations (1) and (2) are also used to calculate the touch candidate points.

Figure 4:
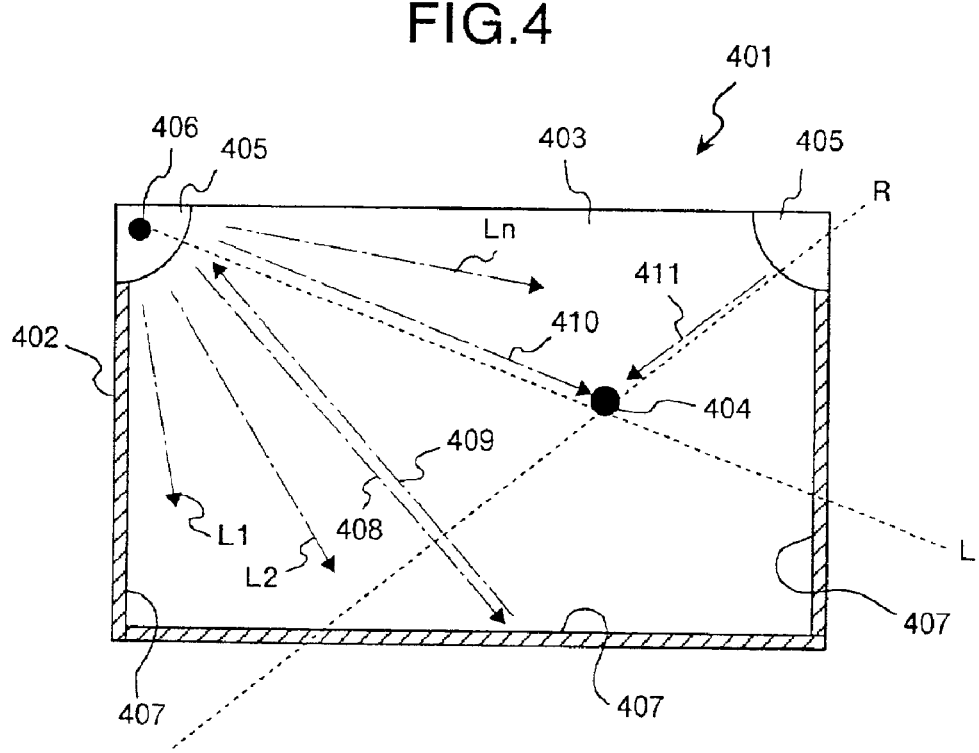
FIG. 4 is a diagram that explains a basic structure of the information input/output apparatus according to the first embodiment.

The introduction of the above equations (1) and (2) will be explained in further detail. In order to explain the coordinate detection principle of the coordinate input device used in the present embodiment, a basic structure of the information input/output apparatus shown in FIG. 3 will be explained with reference to FIG. 4 to FIG. 9. FIG. 4 shows an optical information input/output apparatus that projects fan-shaped luminous flux in a plane shape parallel with the display screen 104. This type of coordinate input device is also called an optical thin-film type coordinate input device (hereinafter to be simply referred to as a coordinate input device). The information input/output apparatus has a coordinate input area 403 as a coordinate input plane that is formed by a luminous flux film projected in a fan shape. An indicating unit 404 that functions as a light-interfering unit like an operator's finger tip, a pen, or an indication bar, is inserted into the coordinate input area 403, thereby to interfere the luminous flux within the coordinate input area 403. With this arrangement, it is made possible to detect an indication position and input characters or the like based on a position of an image formed by the light receiving element like the CCD (charge-couple device).

The coordinate input area 403 as an internal space of a coordinate input member 402 having a square casing structure is superimposed with the display screen 104 that electronically displays an image in a two-dimensional shape forming a plane (or substantially a plane). Consider an instance that the indicating unit 404 that functions as a light-interfering unit like an operator's finger tip, a pen, or an indication bar that is optically opaque material has touched this coordinate input area 403. The coordinate input device has an object of detecting the coordinates of this indicating unit 404.

Light emitting/receiving units 405 are mounted on both upper ends (or both lower ends) of the coordinate input area 403. The optical units 202a and 202b correspond to the light emitting/receiving units 405 in the above information input/output apparatus. The light emitting/receiving units 405 irradiate fluxes of optical beams (probe beams) of L1, L2, L3, . . . , and Ln toward the coordinate input area 403. In actual practice, these optical beam fluxes are plane fan-shaped optical waves (a luminous flux film) that proceed along a plane parallel with the coordinate input plane that spreads from a point light source 406.

A retroreflection member (a retroreflection unit which corresponds to the optical reflection film 201 of the information input/output apparatus) 407 is mounted on the peripheral portion of the coordinate input area 403 by facing the retroreflection plane toward the center of the coordinate input area 403. The retroreflection member 407 is a member that has characteristic of reflecting the incident beams toward the same direction regardless of a light-incident angle. For example, consider one probe beam 408 among the plane fan-shaped optical waves that are emitted from the light emitting/receiving unit 405. This probe beam 408 is reflected by the retroreflection member 407, and proceeds to return to the light emitting/receiving unit 405 as a retroreflection beam 409 through the same optical path again. The light emitting/receiving unit 405 is installed with a light emitting/receiving unit to be described later. It is possible to decide whether a retroreflection beam of each of the probe beams L1 to Ln has returned to the light emitting/receiving unit or not.

Consider that an operator has touched a position P with a finger (the indicating unit 404). In this instance, a probe beam 410 is interfered by the finger at the position P, and does not reach the retroreflection member 407. Therefore, the retroreflection beam of the probe beam 410 does not reach the light emitting/receiving unit 405. It is detected that the retroreflection beam corresponding to the probe beam 410 has not been received. Based on this, it is possible to detect that the indicating unit 404 has been inserted into an extension line (a straight line L) of the probe beam 410.

Similarly, a probe beam 411 is irradiated from the light emitting/receiving unit 405 that is installed at the right upper side shown in FIG. 4. It is detected that the retroreflection beam corresponding to the probe beam 411 has not been received. Based on this, it is possible to detect that the indicating unit 404 has been inserted into an extension line (a straight line R) of the probe beam 411. When it is possible to obtain the straight line L and the straight line R, it is possible to obtain the coordinates of the point into which the indicating unit 404 has been inserted, by calculating the coordinates of the intersection P based on the principle of trigonometrical measurement.

Figure 5:
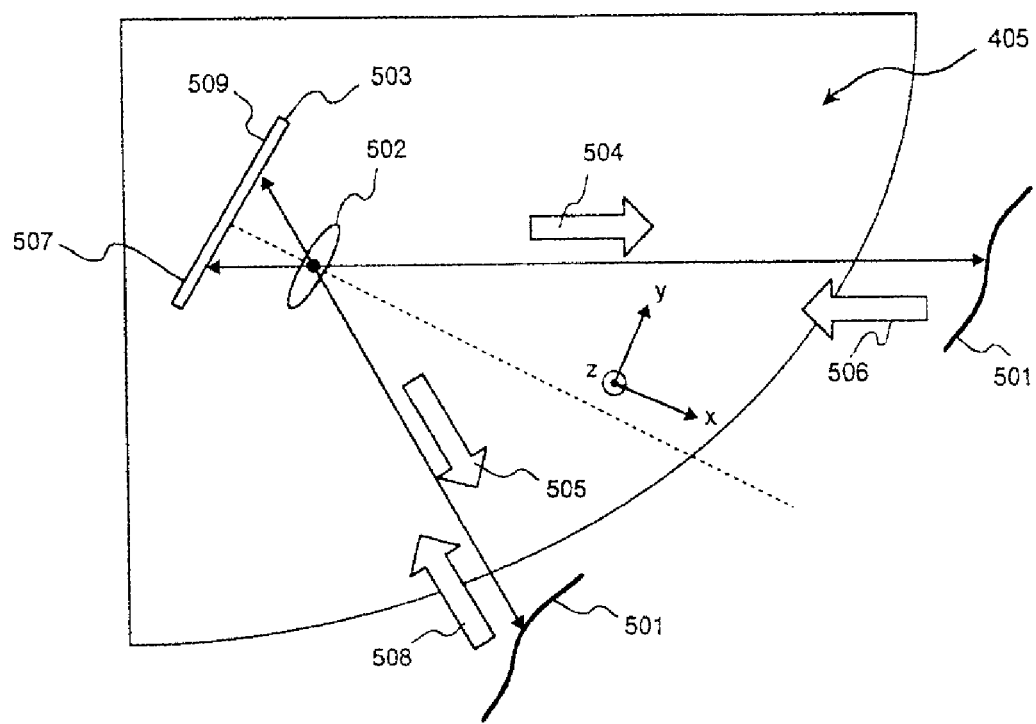
FIG. 5 is another diagram that explains a basic structure of the information input/output apparatus according to the first embodiment.

A structure of the light emitting/receiving unit 405 and a mechanism of detecting which probe beam has been interfered among the probe beams L1 to Ln will be explained next. FIG. 5 is a diagram that shows an outline structure of the inside of the light emitting/receiving unit 405. This is the light emitting/receiving unit 405 installed on the coordinate input plane of FIG. 4 viewed from a direction perpendicular to the coordinate input area 403. To simplify the explanation, a two-dimensional plane parallel with the coordinate input area 403 will be explained.

The light emitting/receiving unit 405 is broadly constructed of a point light source 406, a condenser lens 502, and a light receiving element 503 that functions as a CCD and a light receiving unit. The point light source 406 irradiates fan-shaped beams to a direction opposite to the light receiving element 503 as viewed from a light source (to be described later) as a light emitting unit. The fan-shaped beams irradiated from the point light source 406 are considered as a collection of probe beams that proceed to directions of arrow marks 504 and 505 and other directions.

A probe beam that proceeds to the direction of the arrow mark 504 is reflected by the retroreflection member 407 to a direction of an arrow mark 506, passes through the condenser lens 502, and reaches a position 507 on the light receiving element 503. Further, a probe beam that proceeds to the direction of the arrow mark 505 is reflected by the retroreflection member 407 to a direction of an arrow mark 508, passes through the condenser lens 502, and reaches a position 509 on the light receiving element 503. As explained above, the beams that are emitted from the point light source 406, reflected by the retroreflection member 407, and return through the same paths reach mutually different positions on the light receiving element 503 based on the operation of the condenser lens 502. Therefore, when a certain probe beam is interfered by inserting the indicating unit 404 into a certain position on the coordinate input area 403, the beam does not reach the point on the light receiving element 503 corresponding to this probe beam. Therefore, it is possible to know which probe beam has been interfered, by checking the light intensity distribution on the light receiving element 503.

Figure 6:
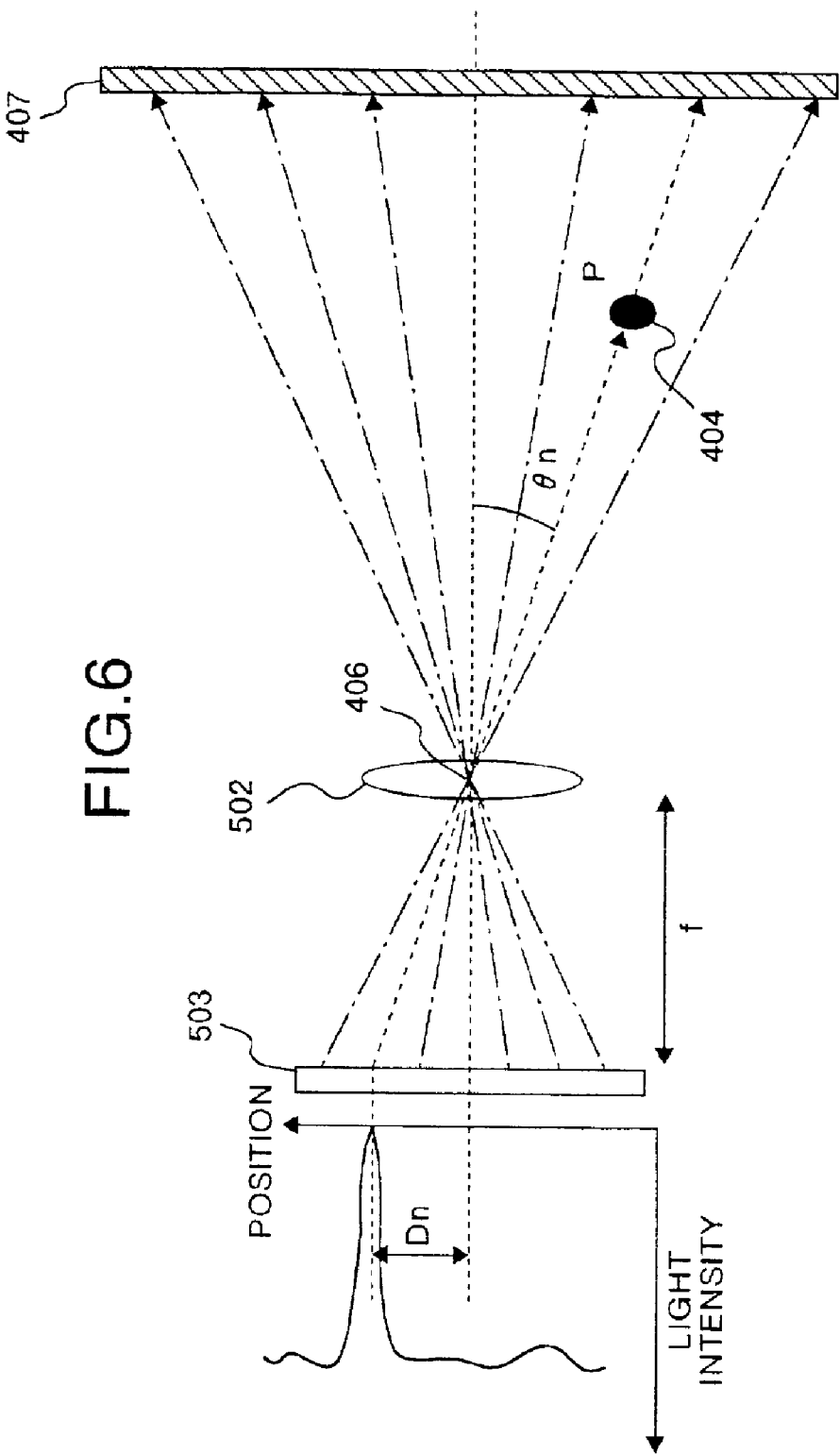
FIG. 6 is still another diagram that explains a basic structure of the information input/output apparatus according to the first embodiment.

FIG. 6 is a diagram that explains the above operation in further detail. In FIG. 6, it is assumed that the light receiving element 503 is installed on a focal plane (a focal distance f) of the condenser lens 502. A beam emitted from the point light source 406 to the right shown in FIG. 6 is reflected by the retroreflection member 407, and returns through the same path. Therefore, this beam is condensed to the position of the point light source 406 again. The center of the condenser lens 502 is set to coincide with the position of the point light source. As the retroreflection beam that has returned from the retroreflection member 407 passes through the center of the condenser lens 502, this beam proceeds through a symmetrical path to the backside of the lens (at the light receiving element side).

The light intensity distribution on the light receiving element 503 will be considered. When the indicating unit 404 has not been inserted, the light intensity distribution on the light receiving element 503 is substantially constant. However, when the indicating unit 404 that interferes a beam has been inserted into a position P as shown in FIG. 6, a probe beam that passes through this position is interfered, and an area of weak light intensity is generated at a position Dn on the light receiving element 503. A dip appears in the shape of the light intensity distribution of the beam from the light receiving element 503. The position Dn at which this dip appears corresponds to an emission/incidence angle θn of the interfered probe beam. Therefore, it is possible to know θn by detecting Dn. In other words, it is possible to express θn as a function of Dn as follows.

$$\theta n = \arctan(Dn/f) \quad (3)$$

For the light emitting/receiving unit 405 at the left upper side shown in FIG. 4, θn is substituted by θnL, and Dn is substituted by DnL.

Figure 7:
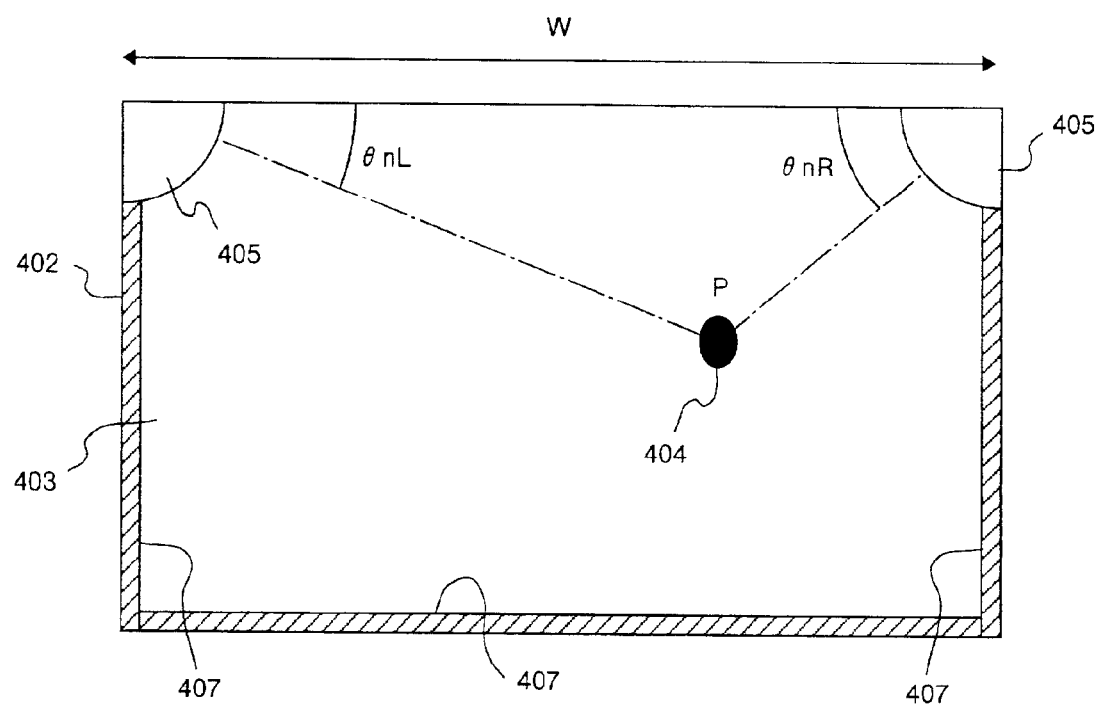
FIG. 7 is still another diagram that explains a basic structure of the information input/output apparatus according to the first embodiment.

Further, an angle θL that is formed between the indicating unit 404 and the coordinate input area 403 is obtained as follows as a function of DnL obtained from the equation (3), from a conversion coefficient g of a geometrical relative positional relationship between the light emitting/receiving unit 405 and the coordinate input area 403 as shown in FIG. 7.

$$\theta L = g(\theta nL) \quad (4)$$

where, θnL=arctan(DnL/f).

Similarly, for the light emitting/receiving unit 405 at the right upper side shown in FIG. 4, the symbol L is substituted by the symbol R in the above equations (3) and (4). Then, the following relationship is obtained from a conversion coefficient h of a geometrical relative positional relationship between the light emitting/receiving unit 405 at the right side and the coordinate input area 403.

$$\theta R = h(\theta nR) \quad (5)$$

where, θnR=arctan(DnR/f).

Assume that the fitting distance of the light emitting/receiving unit 405 on the coordinate input area 403 is w as shown in FIG. 7, and the origin coordinates are set as shown in FIG. 7. Then, the two-dimensional coordinates (x, y) of the point P indicated by the indicating unit 404 on the coordinate input area 403 are expressed by the equations (1) and (2). As x and y can be expressed as functions of DnL and DnR, it is possible to detect the two-dimensional coordinates of the point P indicated by the indicating unit 404, by detecting the positions DnL and DnR at a dark point on the light receiving element 503 on the left and right light emitting/receiving units 405, and by considering a geometrical disposition of the light emitting/receiving units 405.

Figure 8:
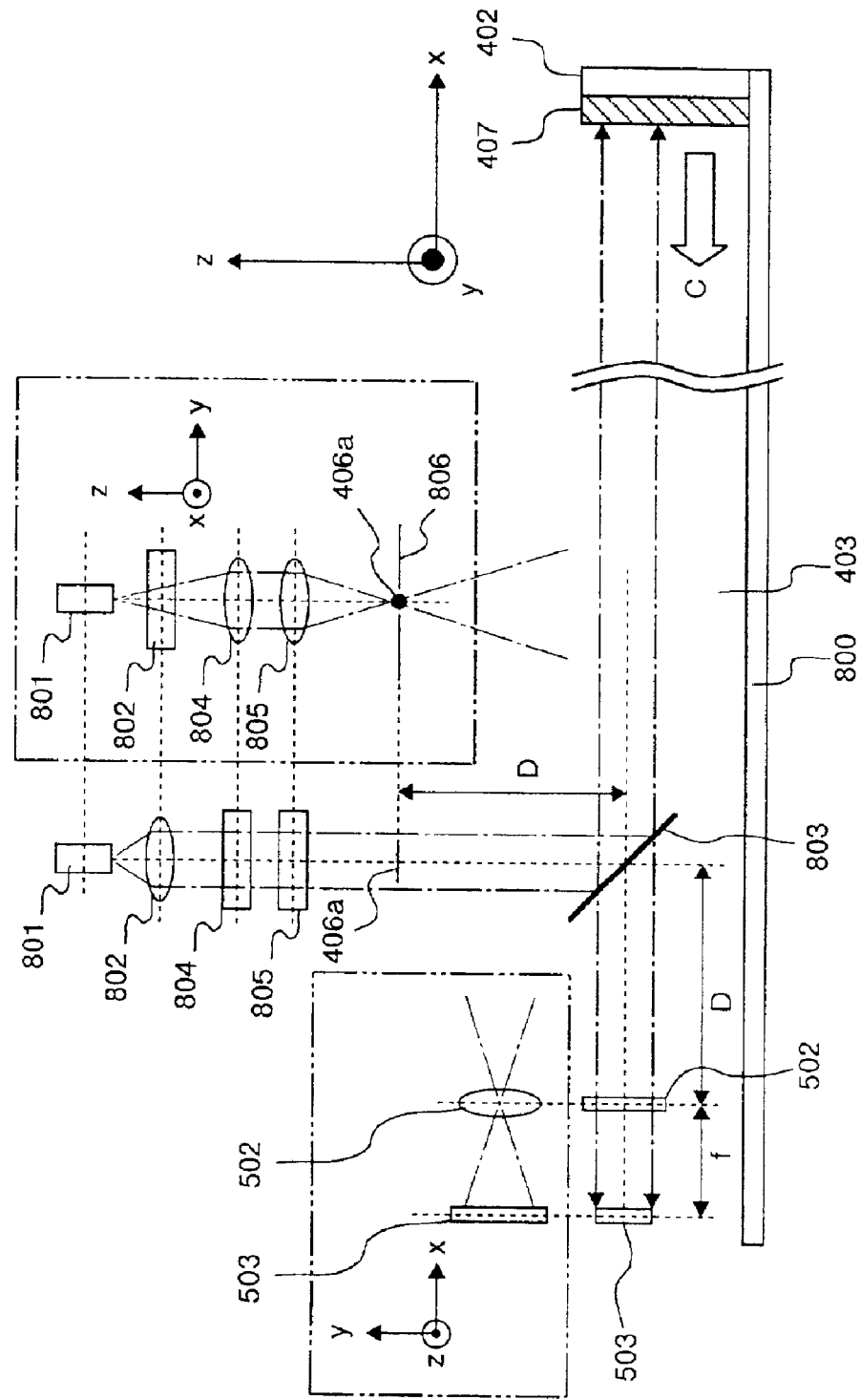
FIG. 8 is still another diagram that explains a basic structure of the information input/output apparatus according to the first embodiment.

Next, an example of installing the optical system on the coordinate input area 403, for example, the surface of the display, will be explained. FIG. 8 shows an example installation of one of the left and right light emitting/receiving units 405 explained in FIG. 4 and FIG. 5 on the display surface of the information input/output apparatus.

In FIG. 8, a reference number 800 denotes a cross section of a display surface as viewed in a direction facing a positive direction from a negative position of the y axis shown in FIG. 5. In other words, FIG. 8 shows an x-z direction as a main. Portions encircled by two-dot chain lines show structures of the same section viewed from separate directions (an x-y direction, and a y-z direction). The display surface 800 shown in FIG. 8 has a structure using a plasma display panel (PDP).

Next, the light emitting unit among the light emitting/receiving units 405 will be explained. For a light source 801 as the light emitting unit, a light source like an LD (laser diode) that can diaphragm a spot to a certain extent is used.

A beam emitted in perpendicular to the display surface 800 from the light source 801 is collimated to only the x direction by the condenser lens 802. This collimated beam is returned later by a half mirror 803, and is distributed as a beam parallel with a direction perpendicular to the display surface 800. After passing through the condenser lens 802, the beam is condensed to the y direction in the drawing with two condenser lenses 804 and 805 of which curvature distribution is orthogonal with that of the condenser lens 802.

Based on the operation of these condenser lenses (lenses 801, 804 and 805), a linearly condensed area is formed at the back side of the condenser lens 805. A slit 806 that is narrow in the y direction and slender in the x direction is inserted there. In other words, a linear two-dimensional light source 406a is formed at the slit position. The light emitted from the two-dimensional light source 406a is reflected by the half mirror 803, and proceeds along the display surface 800 while spreading in a fan shape with the two-dimensional light source 406a as a center in a direction parallel with the display surface 800, without spreading in a direction perpendicular to the display surface 800.

The proceeded beam is reflected by the retroreflection member 407 that is installed on the peripheral end of the display, and returns to a direction (an arrow mark C) of the half mirror 803 through the same path. The beam that has passed through the half mirror 803 proceeds in parallel with the display surface 800, passes through the condenser lens 502, and is incident to the light receiving element 503.

In this instance, the two-dimensional light source 406a and the condenser lens 502 are disposed at a distance of D from the half mirror 803 respectively, and are mutually in a conjugate positional relationship. Therefore, the two-dimensional light source 406a corresponds to the point light source 406 shown in FIG. 6, and the condenser lens 502 corresponds to the lens 502 shown in FIG. 5.

Figure 9:
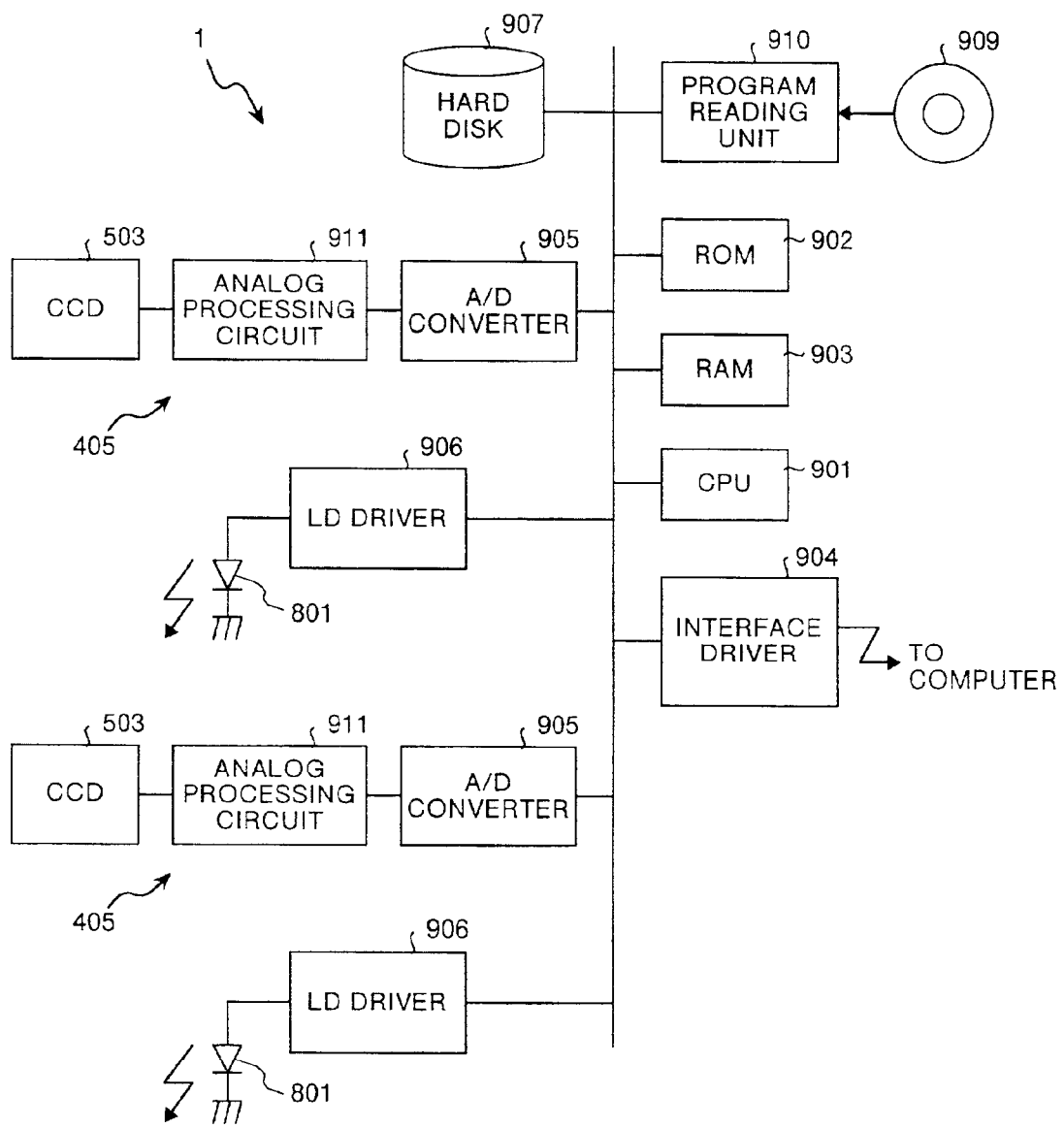
FIG. 9 is still another diagram that explains a basic structure of the information input/output apparatus according to the first embodiment.

FIG. 9 shows a structure block diagram of a control circuit of the light source 801 and the light receiving element 503. This control circuit carries out a light emission control of the light source 801 and a calculation of an output from the light receiving element 503. As shown in FIG. 9, the control circuit is constructed of a CPU (central processing unit) 901 as a center, a ROM (read-only memory) 902 and a RAM (random-access memory) 903 that store programs and data, an interface driver 904 that connects to a computer, an A/D (analog/digital) converter 905, an LD driver 906, and a hard disk 907 that stores various kinds of program codes (control programs). These sections are connected via a bus. The CPU 901, the ROM 902 and the RAM 903 constitute a microcomputer as a computer.

This microcomputer is connected with a program reading unit 908 like a floppy disk driving unit, a CD-ROM driving unit, or an MO driving unit which reads various kinds of program codes (control programs) stored in a recording medium 909 like a floppy disk, a hard disk, an optical disk (a CD-ROM, a CD-R, a CD-R/W, a DVD-ROM, a DVD-RAM), an optical magnetic disk (MO), or a memory card.

As a circuit that calculates the output from the light receiving element 503, an analog processing circuit 911 is connected to the output terminal of the light receiving element 503 as shown in the drawing. A reflection beam that has been incident to the light receiving element 503 is converted into an analog image data having a voltage corresponding to the light intensity within the light receiving element 503, and is output as an analog signal. The analog processing circuit 911 processes this analog signal, and the A/D (analog/digital) converter 905 converts the signal into a digital signal, and delivers this signal to the CPU 901. The CPU 901 calculates the two-dimensional coordinates of the indicating unit 404.

This control circuit may be built into the same casing unit as that of one of the light emitting/receiving units 405, or may be built into a part of the display that forms the coordinate input area 403 as a separate casing unit. It is preferable to provide an output terminal to output the coordinate data calculated by the computer via the interface driver 904.

Various kinds of program codes (control programs) that have been stored in the hard disk 907 or various kinds of program codes (control programs) that have been stored in the recording medium 909 are written into the RAM 903 according to the power supply to the coordinate input device, and these program codes (control programs) are executed.

The coordinate control section 107 of the first embodiment generates a control signal to make the tool bar displayed, and calculates coordinates of one point p0 (a plurality of touch detection points) based on touch candidate points. In the first embodiment, a plurality of touch detection points are calculated in the following method.

First, the coordinate control section 107 obtains x coordinates ($x_{max}$) having a maximum value, x coordinates ($x_{min}$) having a minimum value, y coordinates ($y_{max}$) having a maximum value, and y coordinates ($y_{min}$) having a minimum value, from among the point pa (x1, y1), the point pb (x2, y2), the point pc (x3, y3), and the point pd (x4, y4). Then, the coordinate control section 107 calculates the coordinates of the plurality of touch detection points p0 (x0, y0) as follows.

$$x0=(x_{max}+x_{min})\div 2 \tag{6}$$

$$y0=(y_{max}+y_{min})\div 2 \tag{7}$$

The coordinate control section 107 outputs the calculated plurality of touch detection points p0 (x0, y0) to the screen control section 108 together with the control signal. When the control signal has been input, the screen control section 108 displays a tool bar to the plurality of touch detection points p0 (x0, y0) of the display screen 104. The tool bar display position is not limited to the plurality of touch detection points p0. For example, the tool bar may be displayed at a position p0' at a distance not larger than a predetermined distance from the plurality of touch detection points on the display screen 104 as shown in FIG. 3.

A general touch panel is set such that simultaneous touches are disregarded, in order to prevent the occurrence of a malfunction when a plurality of operators touch the panel simultaneously. According to the information input/output apparatus of the first embodiment that uses simultaneous touches to generate a control signal, when simultaneous touches have been detected in order to prevent the occurrence of a malfunction when a plurality of operators touch the panel simultaneously, the information input/output apparatus calculates a distance that reflects a distance between the touched points based on a result of this detection. When the calculated distance is at least a predetermined length, the information input/output apparatus does not generate a control signal. In this way, the information input/output apparatus discriminates between the simultaneous touches and touches that are carried out simultaneously by a plurality of operators.

In the first embodiment, the distance Lx in the x direction and the distance Ly in the y direction are calculated based on the $x_{max}$, $x_{min}$, $y_{max}$, and $y_{min}$. In other words, when a plurality of touch points have been detected, the coordinate control section 107 calculates the distance Lx and the distance Ly from the following equations (8) and (9). According to the first embodiment, the information input/output apparatus has been set by a program not to generate a control signal when at least one of the distance Lx and the distance Ly is equal to or larger than a predetermined length (a specific length).

$$Lx=x_{max}-x_{min} \tag{8}$$

$$Ly=y_{max}-y_{min} \tag{9}$$

The specific length that is compared with the distance Lx and the distance Ly is set to a general distance between touch points when a person touches the touch panel with one hand. By setting the specific length to touch point levels of one hand, it is possible to judge whether the touch points are the simultaneous touch points of one operator with one hand or not.

FIG. 10 is a diagram that explains the operation procedure of the information input/output apparatus. FIG. 10 shows a touch panel 200 of the information input/output apparatus, and a tool bar 1001 displayed on a display screen 104 of the touch panel 200. An operator simultaneously touches the display screen 104 with two fingers of one hand in which a pen is not held, for example. The coordinate input device detects the simultaneous touch points, and sends coordinate data to the coordinate input section 106.

The coordinate data is sent to the screen control section 107 via the coordinate input section 106. When the screen control section 107 has judged based on the coordinate data that simultaneously touches have been carried out, the screen control section 107 outputs the control signal and the plurality of touch detection points, or a point from the plurality of touch detection points that is at not a larger distance from the predetermined distance (a near point), to the screen control section 108. The screen control section 108 makes the tool bar 1001 displayed at the plurality of touch detection points or the point near the plurality of touch detection points, based on the control signal.

In the tool bar 1001 shown in FIG. 10, there are registered functions of software that is eigen to a multi-media board as a kind of electronic blackboard system (hereinafter to be referred to as MB software), overwrite pen, and enlarged display. When the operator touches (one-point touch) a button 1002 of an item of a desired function, a program for executing the function corresponding to the touched button is started.

As described above, according to the first embodiment, when simultaneous touches have been carried out, a tool bar is displayed at the plurality of touch detection points. Based on this, the operator can make the tool bar displayed without moving from the position where the simultaneous touches have been carried out. Therefore, according to the information input/output apparatus of the first embodiment, the operator can make the tool bar displayed at an optional position on the display screen 104, and operate the tool bar without moving from the position where the operator has carried out simultaneous touches.

After the tool bar has been displayed based on the simultaneous touches, when only one of the simultaneously touched fingers is off from the tool bar, there is a possibility that the coordinate control section 107 judges that one-point touch has been carried out on the tool bar. In this instance, when the touch point of the one-point touch is near to one of the buttons 1002, the screen control section 108 makes the function corresponding to the button near the touched point executed.

In order to prevent the processing from being executed when one of the two simultaneous touch fingers is off, the following operation is carried out according to the first embodiment. That is, when the coordinate control section 107 has detected simultaneous touches, the coordinate control section 107 does not detect the next touch on the touch panel until when a status that the fingers are off from all the detected touch points (detach) has been detected.

The control program of the first embodiment further includes a program for making it possible to edit the tool bar 1001. Therefore, the user can edit the function registered in the tool bar to match the user's needs. Next, the tool bar editing procedure will be explained.

FIGS. 11A, 11B and 11C are diagrams that explain a procedure of editing a tool bar. These are diagrams showing a tool bar editing screen that is used to edit a tool bar displayed by simultaneous touches. The tool bar editing screen shown in the drawings is opened based on a predetermined operation set in advance such as a clicking of an "edit" button of the tool bar displayed by simultaneous touches.

The tool bar editing screen shown in these diagrams consists of three screens of a simultaneous touch function setting screen (FIG. 11A), a simultaneous touch function registering screen (FIG. 11B), and a file searching screen (FIG. 11C). The simultaneous touch function setting screen is a screen that is first displayed on the tool bar editing screen. This is a screen that displays functions currently registered on the tool bar, and deletes a displayed function, or set a new function.

The tool bar editing screen shown in the drawings displays five pointers 1101 that show item numbers and an item to be edited, five name display columns 1103 that show names of functions, buttons 1102 that show functions, a setting key 112 that is used to determine a setting, a deletion key 113 that is used to delete a setting, and a forward key 1114, a backward key 1115, an OK key 1116, and a cancel key 1117 that are used to select an item to be edited.

When the operator has selected an item by clicking one of the pointers 1101, a black circle is displayed on this selected pointer. The selected item can be scrolled up or down by clicking the forward key 1114 or the backward key 1115. When the setting key 1112 has been clicked and the OK key 1116 has been clicked, the simultaneous touch function registering screen is displayed.

The simultaneous touch function registering screen displays a name display column 1112 that displays a name of a function, a file name display column 1122 that displays a file in which a program for executing the function is stored, a selection key 1123 that is used to select a button that shows a function, a preview column 1124 that displays a button selected by the selection key, and a reference key 1125, an OK key 1126, and a cancel key 1127 that are used to make the preview column 1124 display a button.

When the name of a function to be registered and a button have been determined on the simultaneous touch function registering screen, the operator clicks the OK key 1126 and makes the file searching screen displayed. The file searching screen displays a search destination column 1131 that displays a search destination of a file in which a program is stored, a file type column 1134 that displays a type of a file to be searched for, a file name column 1133 that displays a file name, an open key 1135 that opens a searched file, a display column 1132 that displays the contents of an opened file, and a cancel key 1136.

The operator selects a file search destination and makes this search destination displayed in the search destination column 1131. Then, the operator selects a file name and a type of a file to be searched for. When the search for the file has been completed, and the file exists in the personal computer 102, this file is opened. The operator can confirm that the personal computer 102 has a program for executing the function displayed on the name display column 1121.

Figure 13:
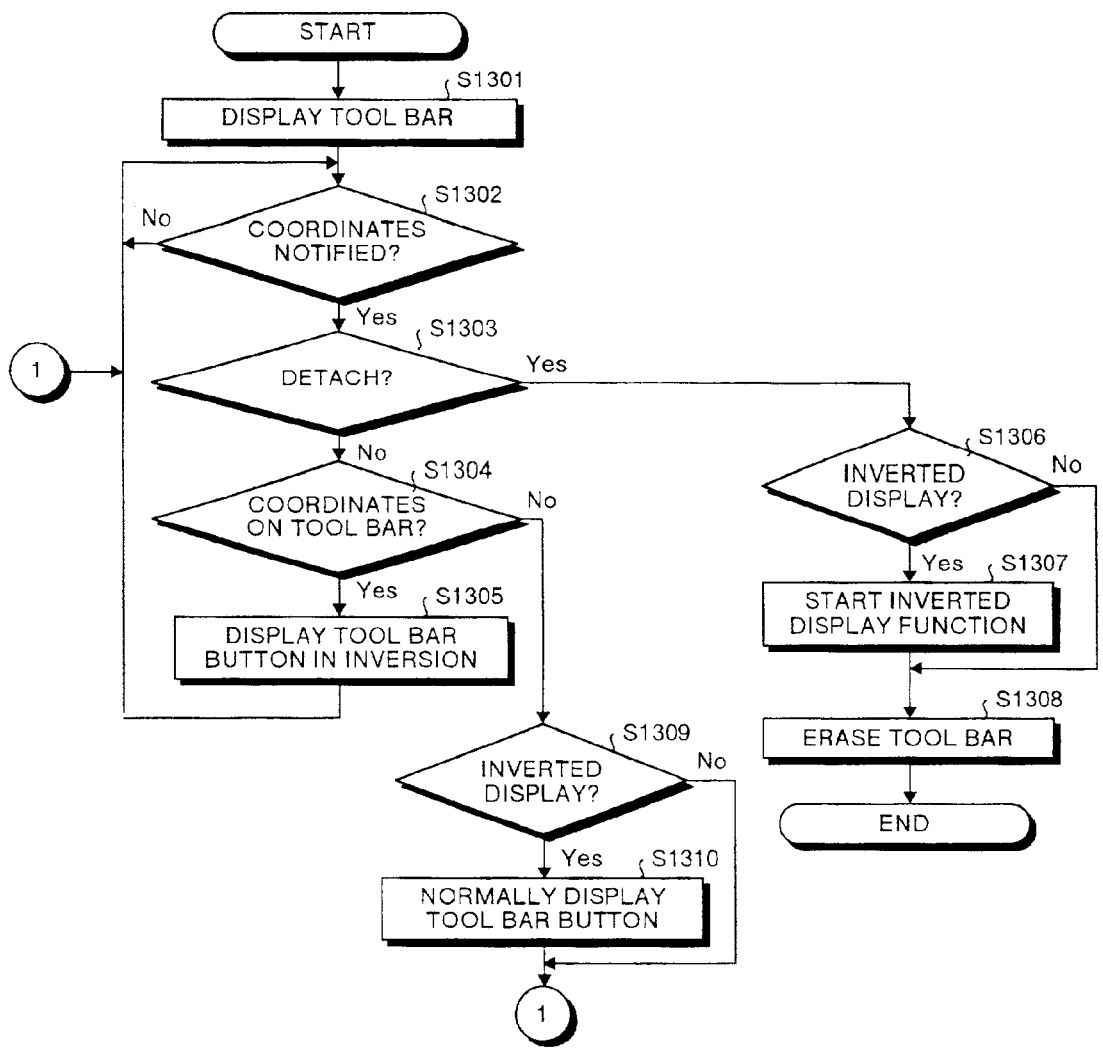
FIG. 13 is a flowchart that explains a method of controlling a display of a tool bar according to the first embodiment.

FIG. 12 and FIG. 13 are flowcharts that explain the information input/output control method of being carried out by the information input/output apparatus explained above. The information input/output control method shown in each flowchart is executed by the personal computer 102 according to a program. FIG. 12 is a flowchart that explains a method of controlling an input of coordinates, and FIG. 13 is a flowchart that explains a method of controlling a display of the tool bar.

In the flowchart shown in FIG. 12, the personal computer 102 first decides whether coordinates (coordinate data) have been input via the coordinate input device 106 or not (step S1201). When it has been decided at step S1201 that coordinates have not been input (No at step S1201), the personal computer 102 waits for the input of the next coordinates.

When it has been decided at step S1201 that coordinates have been input (Yes at step S1201), the personal computer 102 decides whether a touch has been carried out not (step S1202). This decision is made in order to distinguish between an instance that coordinates exist without detaching a finger from a touch point detected last time and an instance that a touch has been carried out this time. When a touch has been carried out this time as a result of the decision made (Yes at step S1202), the personal computer 102 decides whether the input coordinates are at one point or not (step S1203).

When it has been decided at step S1203 that the input coordinates are at one point (Yes at step S1203), the personal computer 102 executes the processing corresponding to a detection of one touch point (step S1204). The personal computer 102 notifies the coordinates of the touch point to the screen control section 108 (step S1205), and decides again whether coordinate data has been input or not (step S1201).

When it has been decided at step S1203 that the input coordinates are not at one point (No at step S1203), the personal computer 102 obtains touch candidate points and decides whether two or more touch candidate points exist or not, based on the coordinate data (step S1206). In the first embodiment, the simultaneous touch points are limited to two points as described above. Therefore, when two or more touch candidate points exist (Yes at step S1206), the personal computer 102 decides that the detection is invalid, and waits for the input of the next coordinates (step S1201).

When it has been decided at step S1206 that the touch candidate points are not larger than two (No at step S1206), the coordinate control section 107 calculates the distance Lx and the distance Ly (step S1208). The personal computer 102 decides whether the distance Lx and the distance Ly calculated are larger than a specific length respectively or not (step S1209). When the distance Lx and the distance Ly calculated are larger than a specific length respectively (Yes at step S1209), there is a possibility that the plurality of touches have been carried out by a plurality of operators as one touch respectively. Therefore, the personal computer 102 decides that the detection is invalid, and waits for the input of the next coordinates (step S1201).

When it has been decided at step S1202 that the input of coordinates is not based on a touch (No at step S1202), the personal computer 102 decides whether a finger has been detached from a touch point or not (step S1212). When it has been decided that a detachment has been carried out (Yes at step S1212), the personal computer 102 decides whether a detected touch point is at one point or not (step S1213). When it has been decided that a detected touch point is at one point (Yes at step S1213), the personal computer 102 notifies a detachment to the screen control section 108 (step S1214).

When the detected touch point is not at one point as a result of the decision made at step S1213 (No at step S1213), the personal computer 102 decides whether simultaneous touches have been detected or not (step S1215). When simultaneous touches have been detected (Yes at step S1215), the screen control section 108 starts the tool bar control program and makes the tool bar displayed on the display screen 104 (step S1216). When a detachment has not been detected at step S1212 (No at step S1212), the personal computer 102 decides whether the input coordinates are at one point or not (step S1217).

When the coordinates are not at one point as a result of the decision made at step S1217 (No at step 1217), the personal computer 102 decides whether one touch point has been detected or not (step S1218). When one touch point has not been detected as a result of the decision made (No at step S1218), the personal computer 102 waits for the input of the next coordinate data (step S1201). On the other hand, when one touch point has been detected as a result of the decision made at step S1218 (Yes at step S1218), it is considered that there has been another touch while one-point touch is being made. In this instance, the coordinate control section 107 decides that the point that has been input first has been touched, and notifies this to the screen control section 108 (step S1219).

When it has been decided at step S1217 that coordinates of one point have been detected (Yes at step S1217), the personal computer 102 decides whether one touch point has been detected or not (step S1220). When one touch point has been detected as a result of the decision made (Yes at step S1220), the personal computer 102 calculates the coordinates of the touch point (step S1221). When one touch point has not been detected as a result of the decision made (No at step S1220), the personal computer 102 decides that another touch has been carried out while a touch is being made or one point has been detached from a state of simultaneous touches. The personal computer 102 disregards the coordinates, and waits for the input of the next coordinates (step S1201).

The procedure of controlling a displayed tool bar will be explained with reference to FIG. 13. The procedure explained with reference to FIG. 13 is carried out mainly by the screen control section 108 of the personal computer 102. In the flowchart shown in FIG. 13, a tool bar is first displayed according to the procedure of the flowchart explained with reference to FIG. 12 (step S1301). The screen control section 108 decides whether the coordinates input from the coordinate control section 107 have been notified or not (step S1302). When the coordinates have not been notified as a result of the decision made (No at step S1302), the screen control section 108 waits for the notification of the next coordinates.

When the coordinates have been notified to the screen control section 108 (Yes at step S1302), the screen control section 108 decides whether the touch made to the notified coordinates has been detached or not (step S1303). When it has been decided that the touch made to the notified coordinates has not been detached (No at step S1303), the screen control section 108 decides whether the tool bar is on the notified coordinates or not (step S1304). When the tool bar is on the notified coordinates (Yes at step S1304), the screen control section 108 displays the button on the tool bar corresponding to the coordinates by inverting the button (step S1305). The screen control section 108 waits for the notification of the next coordinates.

On the other hand, when the notified coordinates are not on the tool bar (No at step S1304), the screen control section 108 decides whether the tool bar is being displayed in inversion or not (step S1309). When the tool bar is being displayed in inversion (Yes at step S1309), the screen control section 108 normally displays the tool bar that is being displayed in inversion (step S1310), and waits for the notification of the next coordinates. When the tool bar is not being displayed in inversion (No at step S1309), the screen control section 108 waits for the notification of the next coordinates without changing the display of the tool bar.

When it has been decided at step S1303 that the touch made to the notified coordinates has been detached (Yes at step S1303), the screen control section 108 decides whether the tool bar is being displayed in inversion or not (step S1306). When it has been decided that the tool bar is being displayed in inversion (Yes at step S1306), the screen control section 108 starts the function of the button that is being displayed in inversion (step S1307). Then, the screen control section 108 deletes the displayed tool bar (step S1308), and waits for the notification of the next coordinates. When the tool bar is not being displayed in inversion (No at step S1306), the screen control section 108 deletes the displayed tool bar without starting the function (step S1308), and finishes the processing.

Figure 14:
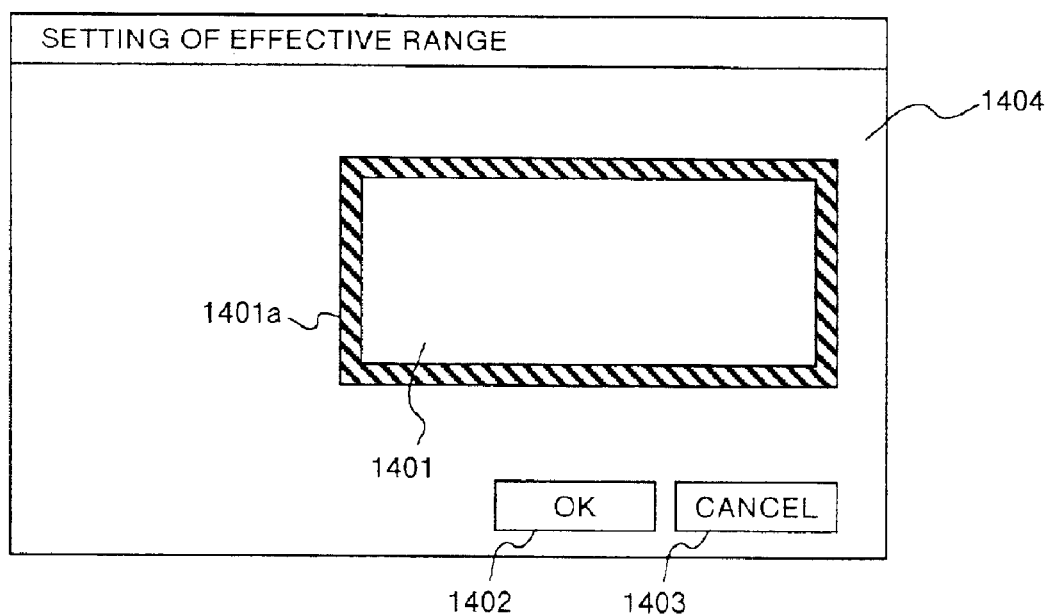
FIG. 14 is a diagram that explains another structure example of the information input/output apparatus according to the first embodiment.

In the first embodiment, the information input/output control method of the present invention is applied to all areas of the display screen 104 of the information input/output apparatus. However, it is possible to apply the information input/output control method of the present invention to only a part area (an effective range) 1401 of the display screen 104 as shown in FIG. 14, for example. It is possible to determine a square external periphery of the effective range 1401 by a general drug operation.

When the information input/output control method of the present invention is applied to only the effective range 1401, the operator can make the tool bar displayed based on simultaneous touches at only a position near to a usual standing position. When a listener or an attendant touch a portion other than the effective range of the display screen 104, it is possible to prevent the simultaneous touches input by the operator from being made ineffective based on an erroneous decision that the touch of the listener is a touch. The effective range 1401 shown in FIG. 14 is set when the operator stands in front of the display screen 104. When the operator stands at the left side or the right side of the display screen 104, it is possible to set only the left side or the right side of the display screen 104 as the effective range.

Figure 15A:
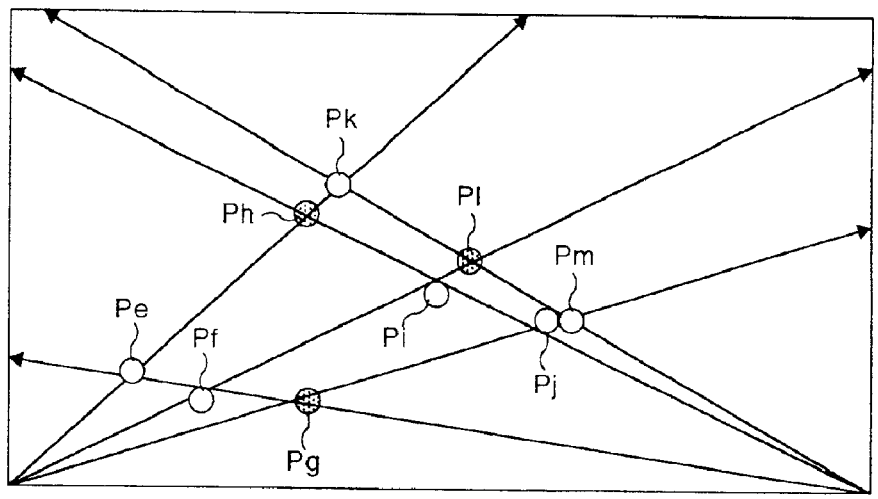
FIGS. 15A to 15C are other diagrams that explain a procedure of obtaining touch candidate points according to the first embodiment of the present invention.
Figure 15B:
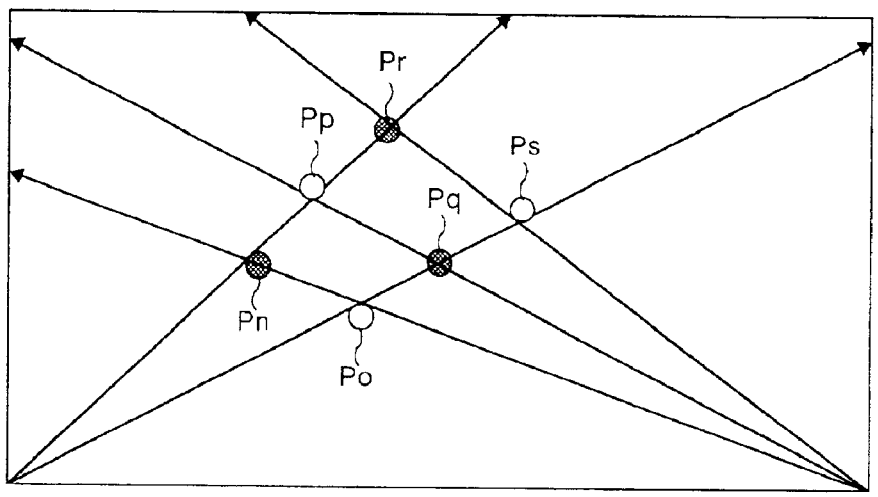
Figure 15C:
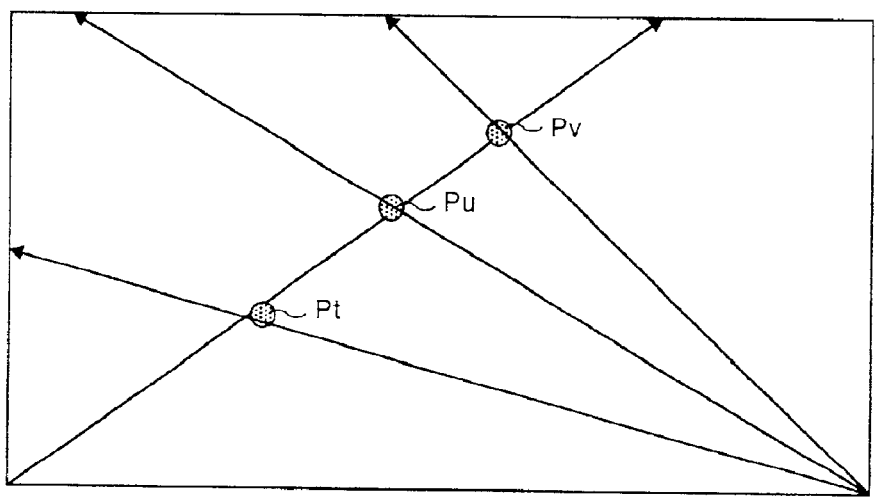

While simultaneous touches are limited to only two simultaneous touch points in the present embodiment, it is possible to apply the present invention to simultaneous touches of two to ten points. FIGS. 15A, 15B and 15C are diagrams that explain detection of three touch points as examples of detecting two or more touch points. In FIGS. 15A to 15C, dark color points show actually touched points, and white color points show touch candidate points. In these drawings, each straight line connects detected points and a sensor that detected these points. A sensor is disposed at a point to which straight lines are concentrated. In FIGS. 15A to 15C, sensors are disposed at both ends of a long side in a similar manner to that in FIG. 3.

When two sensors have detected touch points in three directions respectively as shown in FIG. 15A, these sensors detect six touch points in addition to the actually touched three points. When one of the two sensors has detected touch points in two directions as shown in FIG. 15B, the other sensor detects touch points in three directions. When one of the two sensors has detected touch points in only one direction as shown in FIG. 15C, the other sensor also detects touch points in three directions.

In other words, according to the touch panel of the present embodiment, when three points have been touched simultaneously, the other sensor detects three points without exception, and it is possible to input to the information input/output apparatus the fact that three points have been touched. Similarly, when four points have been touched simultaneously, at least one of the sensors detects touch points in four directions. When five points have been touched simultaneously, at least one of the sensors detects touch points in five directions. Further, according to the present embodiment, it is also possible to detect simultaneous points up to ten points.

Further, the information input/output apparatus of the present invention can allocate mutually different functions to a plurality of points of two to ten points (for example, three of three points, four points and five points). The functions allocated to each point may be any control that is executed by the computer like a normal end of the computer, and a network connection, without being limited to the display of the tool bar. A user can set in advance the correspondence between the number of touch points and the functions allocated to the number of the touch points.

FIGS. 16A, 16B and 16C are diagrams showing a function setting screen that is used to set a correspondence between the number of touch points and the functions allocated to the number of the touch points. The function setting screen consists of three screens of a multi-point touch function setting screen (FIG. 16A), a simultaneous-touch function registering screen (FIG. 16B), and a file searching screen (FIG. 16C). The multi-point touch function setting screen is a screen that is first displayed on the function setting screen. The multi-point touch function setting screen displays eight pointers 1601, eight function name display columns 1604 corresponding to these pointers, a setting key 1605, a deletion key 1606, an OK key 167, and a cancel key 1608.

On the multi-point touch function setting screen, the operator selects the pointer 1601 corresponding to the number of touch points to which a function is to be set, by clicking this button. The operator clicks the OK key 1607 to open the simultaneous-touch function registering screen. The simultaneous-touch function registering screen displays a name display column 1609 that displays the name of a set function, a file name display column 1610 that displays a file name of a file in which a program necessary to execute the function is stored, a reference key 1611 that makes reference to a file, an OK key 1612, and a cancel key 1613.

When the name of a function to be registered and a file name have been determined on the multi-point touch function registering screen, the operator clicks the OK key 1612 and makes the file searching screen displayed. The file searching screen displays a search destination column 1614 that displays a search destination of a file in which a program is stored, a file type column 1617 that displays a type of a file to be searched for, a file name column 1616 that displays a file name, an open key 1618 that opens a searched file, a display column 1615 that displays the contents of an opened file, and a cancel key 1619.

The operator selects a file search destination and makes this search destination displayed in the search destination column 1614. Then, the operator selects a file name and a type of a file to be searched for. When the search for the file has been completed, and the file exists in the personal computer 102, this file is opened. The operator can confirm that the personal computer 102 has a program for executing the function displayed on the display column 1615. The operator returns to the multi-point touch function registering screen, makes the selected function displayed in the function name display column 1004 corresponding to the item selected with the pointer, and clicks the setting key 1605. Based on the above operation, it is possible to set mutually different functions to a plurality of touch points respectively.

In the first embodiment, a personal computer that is a general-purpose computer is used for the control unit of the information input/output apparatus. However, the present invention is not limited to the use of a personal computer. It is also possible to control the information input/output apparatus based on an exclusive structure having a computer that can execute a program of the information input/output control method of controlling the information input/output apparatus. Further, it is also possible to control the information input/output apparatus by combining an exclusive structure with a general-purpose personal computer. For example, coordinates are calculated based on coordinate data that is detection data of the optical unit in the exclusive structure, and the calculated coordinates are input to the personal computer.

(Second Embodiment)

Next, a second embodiment of the present invention will be explained. Constituent elements of the information input/output apparatus of the second embodiment that are similar to those of the information input/output apparatus explained in the first embodiment are attached with like reference numerals, and their explanation will be omitted.

Figure 17A:
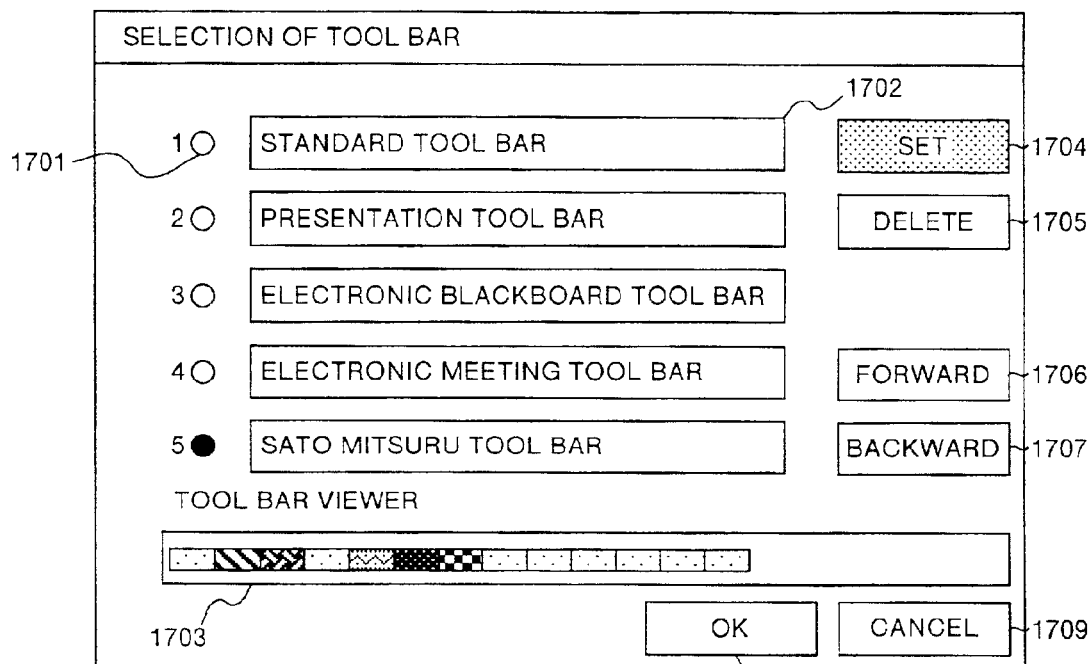
FIGS. 17A and 17B are diagrams that explain a procedure of editing a tool bar according to a second embodiment of the present invention.
Figure 17B:
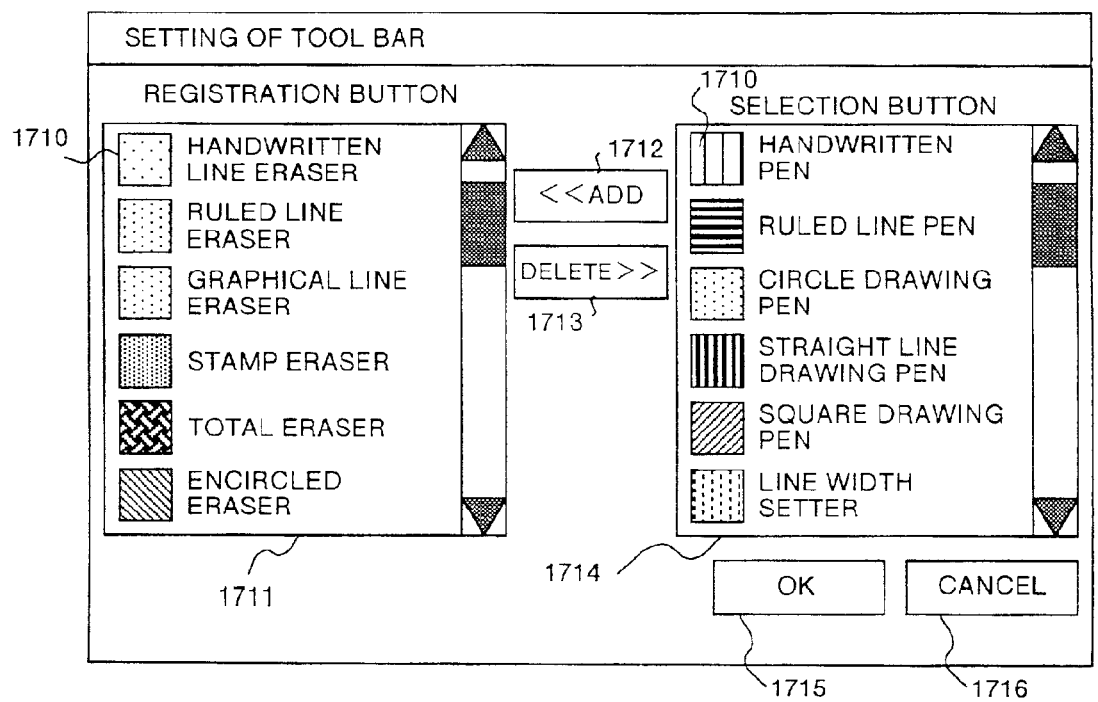

In the second embodiment, a program provided in the information input/output apparatus explained in the first embodiment further includes a procedure of editing a tool bar. FIGS. 17A and 17B are diagrams that explain a procedure of editing a tool bar. FIG. 17A shows a tool bar selection screen, and FIG. 17B shows a tool bar setting screen.

The tool bar selection screen displays five pointers 1701, five tool bar name display columns 1702 corresponding to the pointers 1701, a tool bar viewer 1703, a setting key 1704, a deletion key 1705, a forward key 1706, a backward 1707, an OK key 1708, and a cancel key 1709. On the tool bar selection screen, the operator selects a tool bar registration number by clicking one of the pointers 1701. An optional name is input to and displayed in one of the tool bar name display columns 1702 corresponding to the tool bar of the selected number.

It is possible to edit the tool bar shown in FIG. 17A by selecting a "standard tool bar", a "presentation tool bar", an "electronic blackboard tool bar", and an "electronic meeting tool bar" that are general-purpose tool bars, and a "Sato Mitsuru tool bar" that corresponds to a user. For example, in order to edit the "Sato Mitsuru" tool bar, the operator clicks the fifth pointer 1701, and then clicks the OK key 1708. Based on these clicks, the tool bar setting screen is displayed.

The tool bar setting screen displays a plurality of registered buttons 1710, a registration item display column 1711 that displays names of functions corresponding to these buttons, a selection item display column 1714 that displays a plurality of buttons 1710 that can be registered and names of functions corresponding to these buttons, an addition key 1712, a deletion key 1713, an OK key 1715, and a cancel key 1716.

On the tool bar setting screen, the operator selects an optional button in the selection item display column 1714 by clicking this button, and clicks the addition key 1712. Based on this operation, the operator can add the selected button and a function corresponding to this button to the registration item display column 1711. Based on this addition, the function corresponding to the selected button is registered into the "Sato Mitsuru tool bar", and the display of the button is added to the tool bar. The operator selects an optional button in the registration item display column 1711 by clicking this button, and clicks the deletion key 1713. Based on this operation, the operator can delete a registered button and a registered function from the registration.

A display status of the tool bar that has been set in the above registration is displayed in the tool bar viewer 1703 on the tool bar selection screen. The operator confirms the set tool bar by looking at the displayed tool bar viewer 1703, and clicks the OK key 1708, thereby completing the setting of the "Sato Mitsuru" tool bar.

As explained above, according to the second embodiment, it is easy to edit and customize the tool bar according to the usage of the tool bar and the user's needs. Therefore, according to the second embodiment, it is possible to obtain the effect of facilitating the operation of the information input/output apparatus by making it easy to handle the displayed tool bar, in addition to the effects obtained in the first embodiment.

(Third Embodiment)

Next, a third embodiment of the present invention will be explained. Constituent elements of the information input/output apparatus of the third embodiment that are similar to those of the information input/output apparatus explained in the first and second embodiments are attached with like reference numerals, and their explanation will be omitted.

In the third embodiment, the program held in the information input/output apparatus explained in the first embodiment further includes a procedure of erasing a tool bar from the display screen when simultaneous touches of two or more points have been carried out on the touch panel, and updating a display status of the tool bar. Further, in the third embodiment, the program held in the information input/output apparatus further includes a procedure of changing over a longitudinal direction of the displayed tool bar to a vertical or lateral direction based on a tool bar drugging direction.

According to the information input/output apparatus of the first embodiment, a tool bar is displayed by carrying out simultaneous touches on the display screen, and the tool bar is erased after executing the function set in the tool bar (step S1308 in FIG. 13). According to the information input/output apparatus of the third embodiment, a tool bar is displayed by carrying out simultaneous touches in a status that the tool bar is not displayed on the display screen. Further, the displayed tool bar can be erased or the display can be changed to only the display of a control button by carrying out simultaneous touches in a status that the tool bar is displayed on the display screen.

FIGS. 18A to 18F are diagrams that explain a procedure of changing a tool bar display status according to the third embodiment. These diagrams also explain a procedure of changing over a longitudinal direction of the tool bar to a vertical or lateral direction at the time of returning a tool bar display status to the original display status. The tool bar shown in FIGS. 18A to 18F has a control button 1801 and a function button 1802.

Figure 18A:
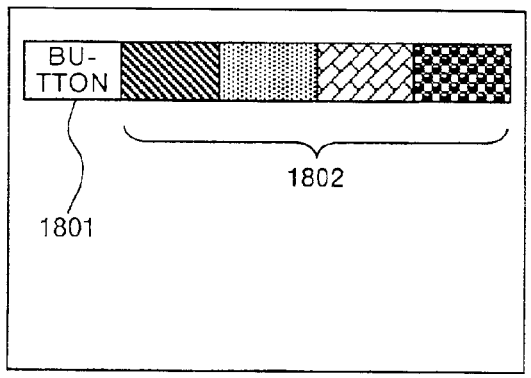
FIGS. 18A to 18F are diagrams that explain a procedure of changing a tool bar display status according to the third embodiment.
Figure 18B:
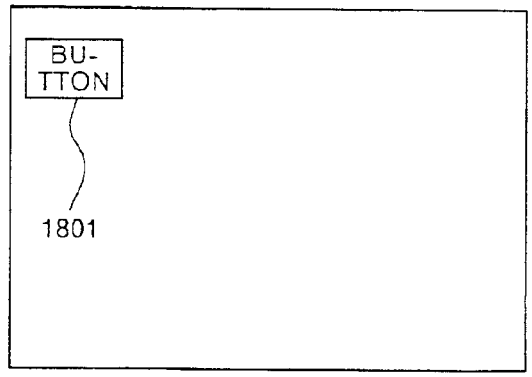

When simultaneous touches are carried out in a status that the tool bar is displayed as shown in FIG. 18A, the screen control section erases the function button 1802 of the tool bar, and displays only the control button 1801 (buttoning). In this instance, it is possible to execute the buttoning of the tool bar when simultaneous touches are carried out at any points on the display screen (including the tool bar).

Figure 18C:
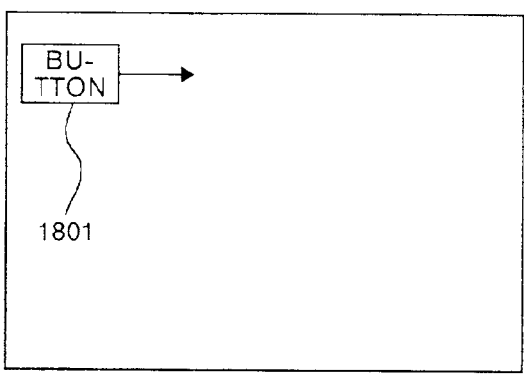
Figure 18D:
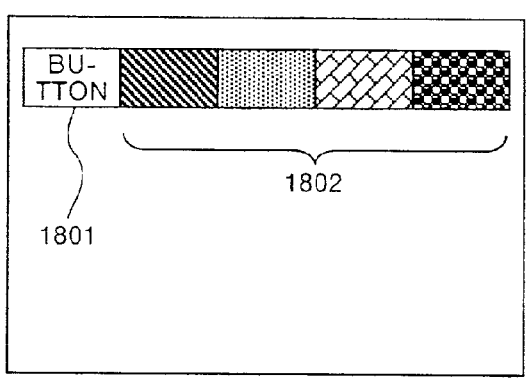
Figure 18E:
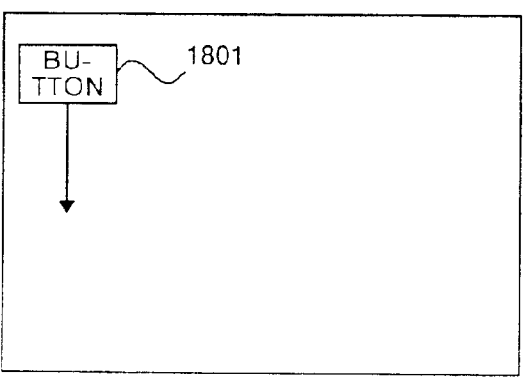
Figure 18F:
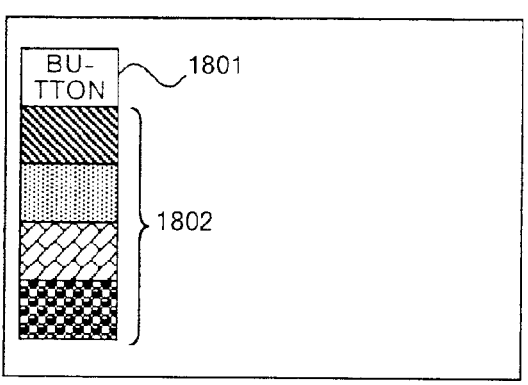

When the operator has drugged the buttoned tool bar, the screen control section 108 obtains a drugging direction based on the coordinates that have been input from the coordinate control section 107. When the control button 1801 has been drugged in a lateral direction, the function button 1802 is displayed as a lateral tool bar that extends in a lateral direction as shown in FIGS. 18C and 18D. When the control button 1801 has been drugged in a vertical direction, the function button 1802 is displayed as a vertical tool bar that extends in a vertical direction as shown in FIGS. 18E and 18F.

Figures 19A, 19B:
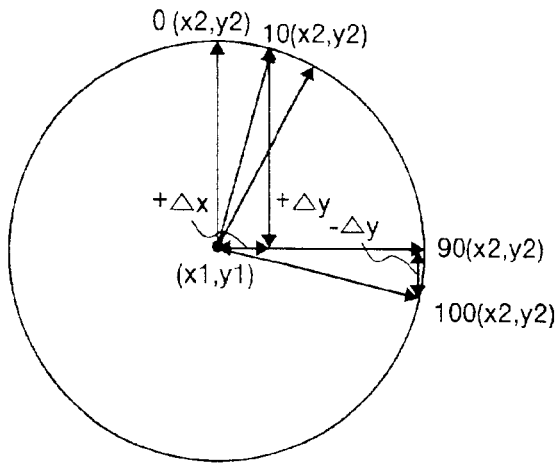
FIGS. 19A and 19B are diagrams that explain a detailed method of calculating a tool bar drugging direction according to the third embodiment.

FIGS. 19A and 19B are diagrams that explain a detailed method of calculating a tool bar drugging direction. After the operator has carried out drugging and detaching operation, the screen control section 108 calculates drug starting coordinates (x1, y1) at which the drugging started, and drug ending coordinates (x2, y2) at which the drugging ended. The screen control section 108 further calculates lengths over which the touched point moved (move lengths) from the drug starting coordinates (x1, y1) to the drug ending coordinates (x2, y2) that have been calculated, in the x direction and the y direction respectively. A move length in the x direction Δx is calculated from x2−x1, and a move length in the y direction Δy is calculated from y2−y1.

A drugging direction is calculated by referring to Δy/Δx (a drugging angle) in an operation direction angle calculation diagram shown in FIG. 19A. The data expressed in the operation direction angle calculation diagram is stored in the program held in the information input/output apparatus of the third embodiment. The operation direction angle calculation diagram shown in FIG. 19A is used to determine a drugging angle at every ten degrees. However, it is possible to set an optional unit of angle to determine a drugging angle.

The operation direction angle calculated in the information input/output apparatus of the third embodiment is expressed by using an approximate value of a drugging angle. For example, when the detected Δx and Δy are minus values and a drugging angle is 0.9000, the screen control section 108 determines 230 degrees as the operation direction angle, based on Δx-, Δy-, and Δy/Δx=0.839 in the operation direction angle calculation diagram.

Figure 20A:
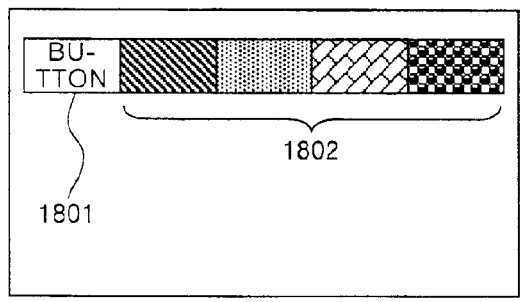
FIGS. 20A to 20D are diagrams that explain an erasing of a displayed tool bar by carrying out simultaneous touches in a status that a tool bar is displayed according to the third embodiment.
Figure 20B:
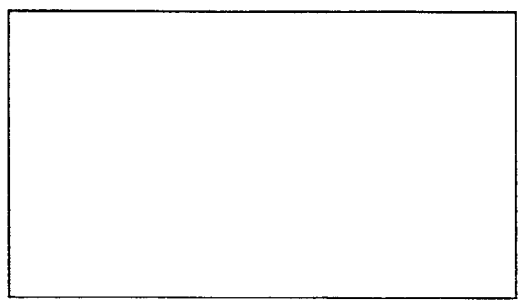
Figure 20C:
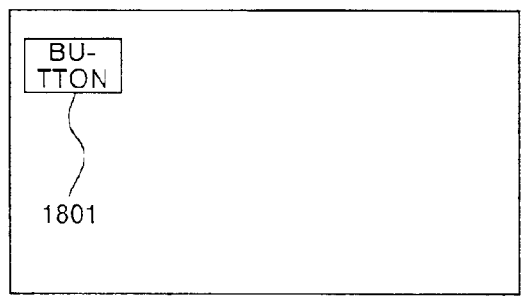
Figure 20D:
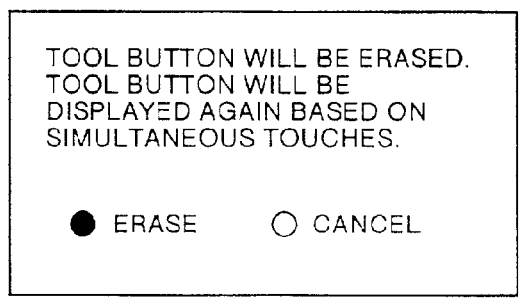

A relationship between an operation direction angle and a display status of the tool bar corresponding to the operation direction angle is as follows.
operation direction angle: 0° to 44° vertical tool bar
operation direction angle: 45° to 134° lateral tool bar
operation direction angle: 135° to 224° vertical tool bar
operation direction angle: 225° to 314° lateral tool bar
operation direction angle: 315° to 359° vertical tool bar FIGS. 20A to 20D are diagrams that explain an erasing of a displayed tool bar by carrying out simultaneous touches in a status that a tool bar is being displayed. The tool bar may be erased immediately by simultaneous touches, as shown in FIGS. 20A and 20B. Alternatively, there may be displayed a message that makes the operator recognize that the tool bar is erased when simultaneous touches have been carried out in a status that only the control button 1801 of the tool bar is being displayed, as shown in FIGS. 20C and 20D.

The operator can set in the program according to the control of the information input/output apparatus about whether the tool bar is to be buttoned or erased, or a message of erasing is to be displayed or not when simultaneous touches have been carried out in a status that the tool bar is being displayed.

Figure 21:
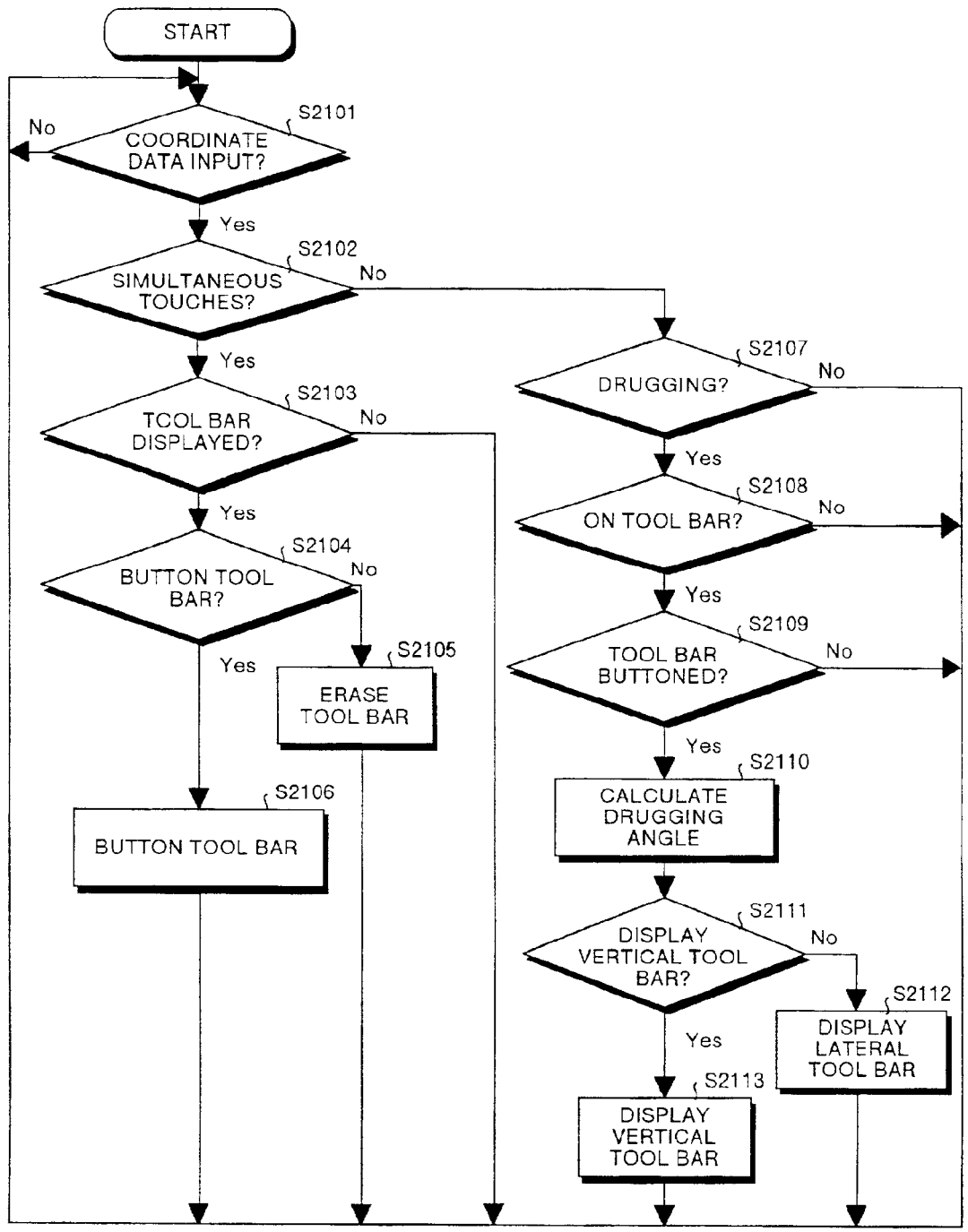
FIG. 21 is a flowchart that explains an information input/output control method according to the third embodiment.

FIG. 21 is a flowchart that explains an information input/output control method according to the third embodiment. The information input/output control method shown in FIG. 21 is executed by the personal computer 102 of the information input/output apparatus according to a program.

Referring to the flowchart shown in FIG. 21, the personal computer 102 first decides whether coordinate data has been input via the coordinate input section 106 or not (step S2101). When coordinate data has not been input as a result of the decision made (No at step S2101), the personal computer 102 waits for the input of coordinate data.

When coordinate data has been input as a result of the decision made (Yes at step S2101), the personal computer 102 decides whether the coordinate control section shows that the coordinate data is simultaneous touch data or not (step S2102). When it has been decided that the coordinate data is simultaneous touch data (Yes at step S2102), the personal computer 102 decides whether the tool bar has already been displayed or not (step S2103). When it has been decided that the tool bar has already been displayed (Yes at step S2103), the personal computer 102 decides whether the buttoning of the tool bar has been set or not (step S2104).

When it has been decided at step S2104 that the buttoning of the tool bar has been set (Yes at step S2104), the personal computer 102 buttons the tool bar, and waits for the input of the next coordinate data. When it has been decided that the buttoning of the tool bar has not been set (No at step S2104), the personal computer 102 erases the tool bar, and waits for the input of the next coordinate data.

When it has been decided that the coordinate data is not simultaneous touch data (No at step S2102), the personal computer 102 decides whether or not the coordinate data shows a drugging operation by taking into account the coordinate data that has been input previously (step S2107). When it has been decided that the coordinate data shows a drugging operation (Yes at step S2107), the personal computer 102 decides whether this drugging has been carried out on the tool bar or not (step S2108).

When it has been decided that this drugging has been carried out on the tool bar (Yes at step S2108), the personal computer 102 decides whether the tool bar has been buttoned or not (step S2109). When it has been decided that the tool bar has been buttoned (Yes at step S2109), the personal computer 102 calculates a drugging angle and obtains an operation direction angle in the procedure explained in FIG. 19 (step S2110). Then, the personal computer 102 decides whether or not a vertical tool bar is to be displayed based on the calculated operation direction angle (step S2111). When it has been decided that a vertical tool bar is to be displayed (Yes at step S2111), the personal computer 102 makes the vertical display tool bar displayed (step S2113). When it has been decided that a vertical tool bar is not to be displayed (No at step S2111), the personal computer 102 makes the lateral display tool bar displayed (step S2112).

The personal computer 102 returns to step S2101 and waits for the input of the next coordinate data, when it has been decided that the input coordinate data does not show a drugging operation (No at step S2107), or when it has been decided that the drugging has not been carried out on the tool bar (No at step S2108), or when it has been decided that the tool bar has not been buttoned (No at step S2109).

According to the above third embodiment, it is possible to obtain the effect of erasing or buttoning the displayed tool bar when the operator carries out simultaneous touches on the display screen, in addition to the effects obtained in the first embodiment. Therefore, the operator can erase or button the tool bar without moving from a position where the operator cannot reach the tool bar.

Further, according to the third embodiment, it is easy to change over the tool bar between the vertical tool bar and the lateral tool bar to match the operator's position with respect to the display screen or the image displayed on the display screen. Therefore, according to the third embodiment, it is possible to further facilitate the operation of the information input/output apparatus.

In the first to third embodiments of the present invention described above, a light-reflection type coordinate input device is used for the information input/output apparatus. However, the present invention is not limited to this structure, and it is also possible to apply the invention to other coordinate input devices. Other structures of information input/output apparatuses to which the present invention can be applied will be explained next.

The information input/output apparatuses explained below include structures similar to those of the coordinate input devices used in the above embodiments. In the drawings to be used below, constituent elements similar to those of the information input/output apparatuses shown in FIGS. 4 to 9 (diagrams that show basic structures of the information input/output apparatuses used in the first to third embodiments) are attached with like reference numerals, and their explanation will be omitted.

"Retroreflection Member for a Pen"

Figure 22:
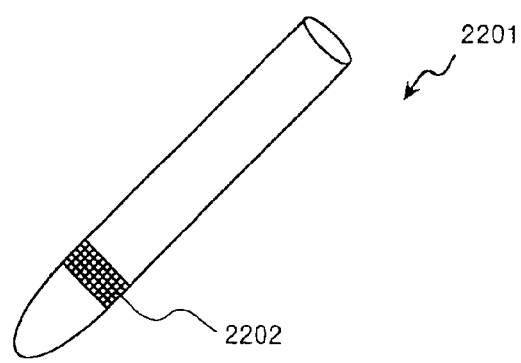
FIG. 22 is a diagram that explains a structure of a coordinate input device that can be applied to the information input/output apparatus of the present invention.

First, an optical reflection type coordinate input device that can be applied to the present invention as other type of coordinate input device will be explained, with reference to FIGS. 22 to 24. FIG. 22 is a perspective view of an indicating unit 2201 that is used in the information input/output apparatus, and FIG. 23 is a front view of one example of the indicating unit 2201 within a coordinate input area 2303 of a coordinate input device 2300.

As shown in FIG. 22, a retroreflection member 2202 is provided near the front end of the indicating unit 2201 that is used to indicate one point within the coordinate input area 2303 of a coordinate input device 2300. This retroreflection member 2202 is formed by arranging a large number of conical corner cubes, for example, and has a characteristic of reflecting an incident beam to a predetermined position regardless of an incident angle.

Figure 23:
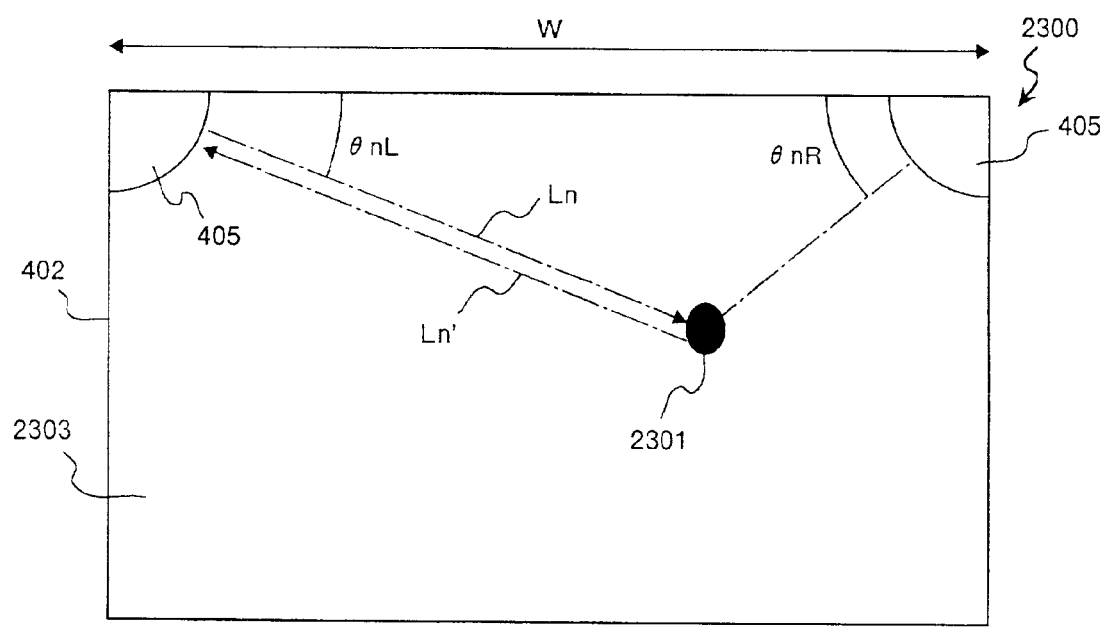
FIG. 23 is another diagram that explains a structure of a coordinate input device that can be applied to the information input/output apparatus of the present invention.

For example, as shown in FIG. 23, a probe beam Ln projected from a left-side light emitting/receiving unit 405 is reflected by the retroreflection member 2202, and is received by the left-side light emitting/receiving unit 405 as a retroreflection beam Ln' via the same optical path again. Therefore, as shown in FIG. 23, it is not necessary to provide a retroreflection member 407 in a coordinate input area 2303 in the coordinate input device 2300, unlike the coordinate input devices used in the first to third embodiments. The indicating unit 2201 has a pen shape, and it is preferable that the indicating unit is made of a rubber or plastic material instead of metal having gloss.

The front end portion of the screen control section 2202 of this indicating unit 2201 is inserted into a suitable position (x, y) of the coordinate input area 2303 of the coordinate input device 2300. When the probe beam Ln in a fan-shaped luminous flux film projected from the left-side light emitting/receiving unit 405 has been reflected by the retroreflection member 2202 of the indicating unit 2201, for example, this retroreflection beam Ln' is received by a light receiving element 503 of the light emitting/receiving unit 405. As explained above, when the light receiving element 503 has received the retroreflection beam Ln', a predetermined position Dn on the light receiving element 503 corresponding to the retroreflection beam Ln' becomes an area of strong light intensity (a bright point).

Figure 24:
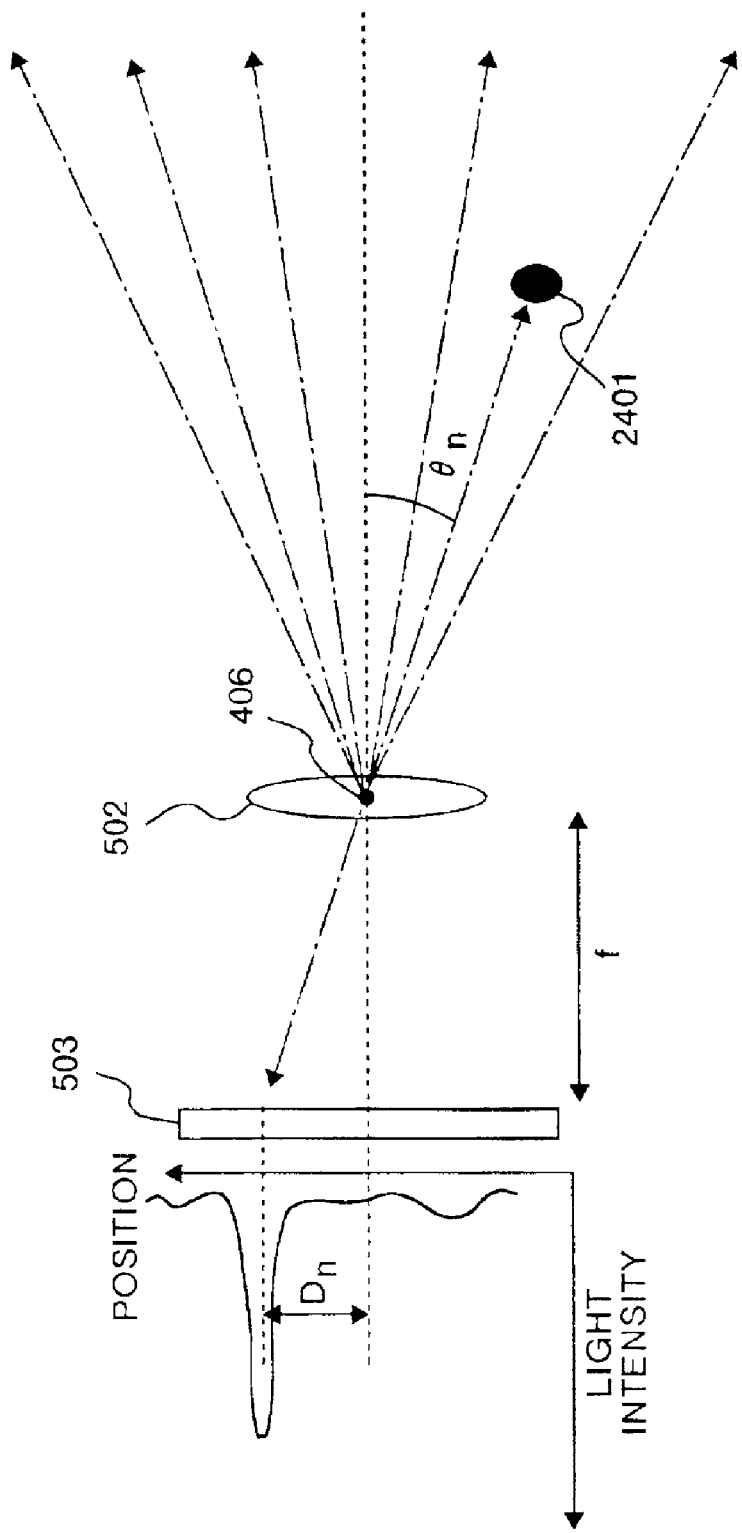
FIG. 24 is still another diagram that explains a structure of a coordinate input device that can be applied to the information input/output apparatus of the present invention.

In other words, as shown in FIG. 24, an area of strong light intensity is generated at a position of Dn on the light receiving element 503, and a peak appears in the light intensity distribution from the light receiving element 503. The position Dn at which this peak appears corresponds to the emission/incidence angle θN of the reflected probe beam. Therefore, it is possible to know θN by detecting this Dn. In other words, in the optical reflection type coordinate input device 2300, it is also possible to calculate the coordinates of the position of the indicating unit 2201 according to trigonometrical measurement based on the peak that appears in the waveform of light intensity, in a similar manner to that of the above coordinate input device.

"Optical Scanning According to a Polygon Mirror"

It is also possible to apply the present invention to a coordinate input device that carries out an optical scanning by using a polygon mirror. A structure of the coordinate input device that carries out an optical scanning by using a polygon mirror will be explained with reference to FIGS. 25 to 29. In FIGS. 25 to 29, constituent elements similar to those explained above are attached with like reference numerals, and their explanation will be omitted. The coordinate input device explained below is a modification of the optical unit of the coordinate input device used in the above embodiments.

More specifically, in the first to third embodiments of the present invention, a coordinate input area has been formed by projecting a fan-shaped luminous flux. On the other hand, according to the coordinate input device that carries out an optical scanning by using a polygon mirror, the coordinate input device has a rotary scanning system like a polygon mirror. A coordinate input device uses a light emitting/receiving unit 2500 that forms a coordinate input area by projecting optical beams emitted from the light source by using the rotary scanning system.

Figure 25:
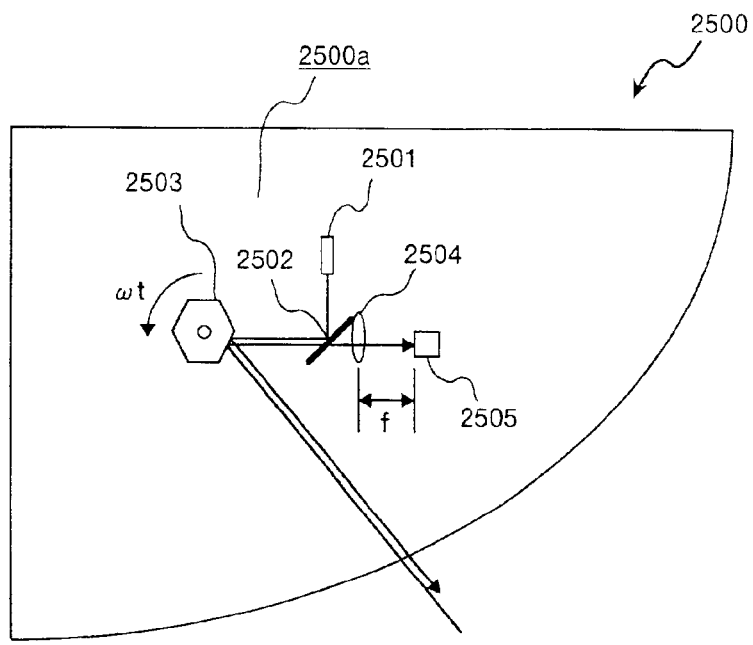
FIG. 25 is still another diagram that explains a structure of a coordinate input device that can be applied to the information input/output apparatus of the present invention.

FIG. 25 is a top plan view that shows a schematic structure of the light emitting/receiving unit 2500. As shown in FIG. 25, the light emitting/receiving unit 2500 includes a light projecting unit 2500a constructed of an LD (a laser diode, or a semiconductor laser) 2501 as a light source that has a driving circuit (not shown) and emits laser beams, a half mirror 2502, a polygon mirror 2503, and a condenser lens 2504, and a light receiving element 2505. The light receiving element 2505 is constructed of a PD (photo diode) that is disposed with a distance of f (where f is a focal distance of the condenser lens 2504) from the condenser lens 2504.

According to this light emitting/receiving unit 2500, the half mirror 2502 returns a laser beam emitted from the LD 2501, and the polygon mirror 2503 that is rotated at a predetermined angular speed (t by a pulse motor (not shown) sequentially reflects the returned beam in a radial shape. Therefore, the light emitting/receiving unit 2500 repetitively projects beams in a radial shape. In other words, a coordinate input area (not shown) is formed with beams that are projected in radial directions from two light emitting/receiving units 2500.

On the other hand, a beam that has been reflected and incident to the light emitting/receiving unit 2500 is reflected by the polygon mirror 2503, and reaches the half mirror 2502. The reflection beam that has reached the half mirror 2502 passes through the half mirror 2502, reaches the light receiving unit 2505, and is converted into an electric signal.

Figure 26:
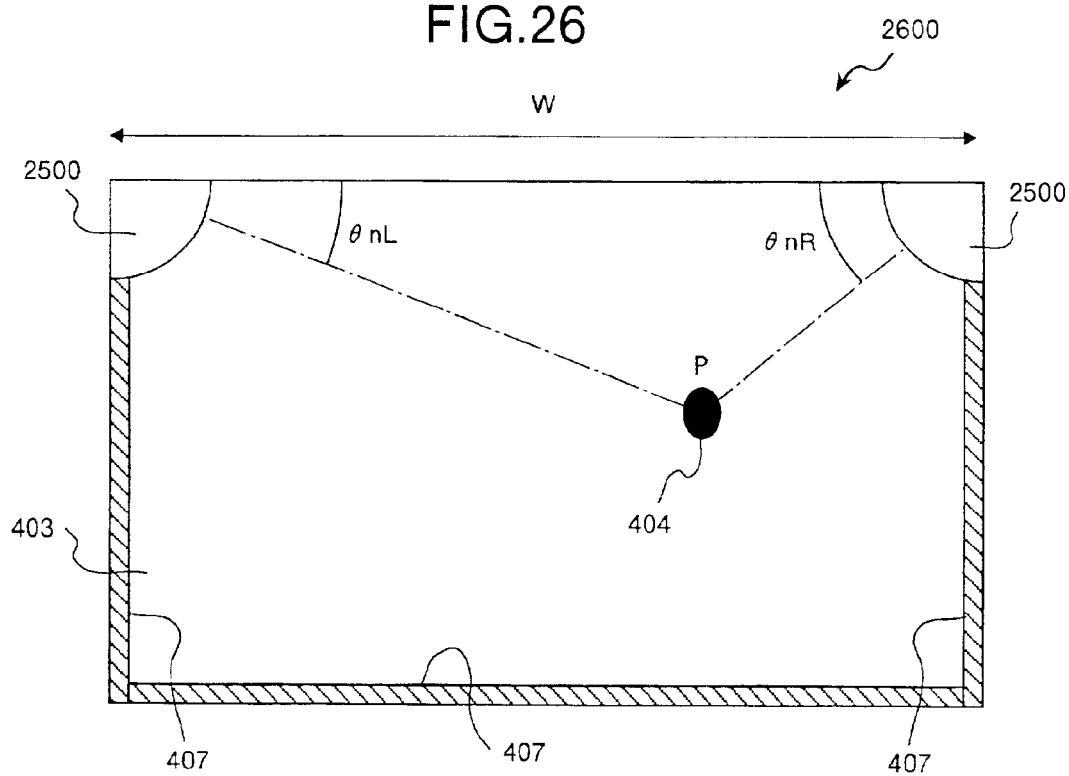
FIG. 26 is still another diagram that explains a structure of a coordinate input device that can be applied to the information input/output apparatus of the present invention.

The application of the light emitting/receiving unit 2500 shown in FIG. 25 to the coordinate input device in place of the light emitting/receiving unit 405 will be explained next. As shown in FIG. 26, when an indicating unit 404 has been inserted into a certain position of a coordinate input area 403 and a beam has been interfered, this beam is not reflected by a retroreflection member 407. Therefore, this beam does not reach a light receiving element 503. As explained above, when the indicating unit 404 is inserted into a certain position of the coordinate input area 403 and a beam has been interfered, a dip appears in the shape of the light intensity distribution of the beam from the light receiving element 503.

Figure 27:
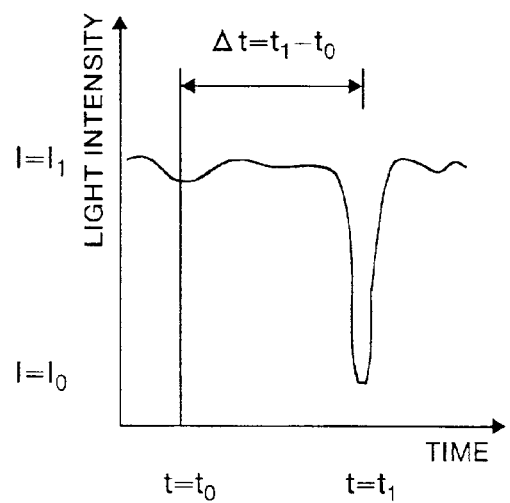
FIG. 27 is still another diagram that explains a structure of a coordinate input device that can be applied to the information input/output apparatus of the present invention.

A method of electrical connection between sections has been known, and therefore, this will not be explained in detail. As shown in FIG. 27, when the indicating unit 404 has not been inserted into the coordinate input area 403, the light intensity shows "I=$I_1$". When the indicating unit 404 has been inserted into the coordinate input area 403 and the retroreflection beam does not return to the light receiving element 2505, the light intensity shows "I=$I_0$". A portion where the light intensity is "I=$I_0$" is a dip. In FIG. 27, a time t=$t_0$ shows a reference position of the rotation of the polygon mirror 2503, and this is a point of time when a rotary-scanned beam has reached a predetermined angle.

Therefore, when the light intensity has become "I=$I_0$" at a point of time $t_1$, an emission angle θ of a beam interfered by the indicating unit 404 that has been inserted into dthe coordinate input area 403 is calculated as follows.

$$=\omega(t_1-t_0)=\omega\Delta t$$

In other words, emission angles θ (θnL, θnR) of beams interfered by the indicating unit 404 that has been inserted into the coordinate input area 403 are calculated in the light emitting/receiving unit 2500 that are provided at left and right sides respectively. The coordinates of the position into which the indicating unit 404 has been inserted are detected according to the trigonometric measuring method based on these emission angles θ (θnL, θnR).

Figure 28:
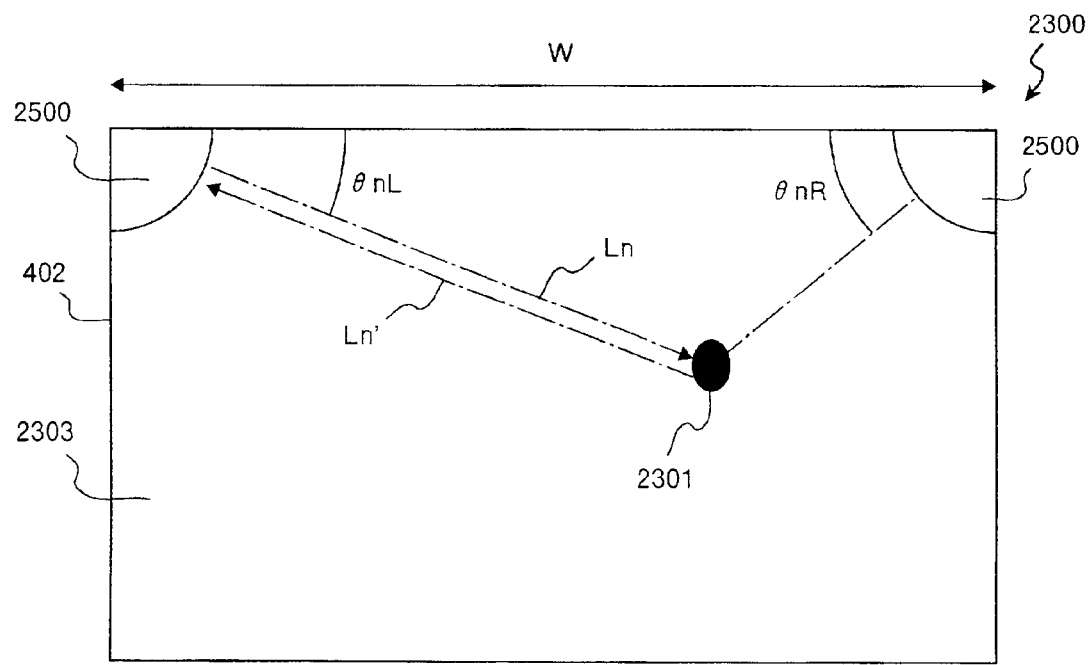
FIG. 28 is still another diagram that explains a structure of a coordinate input device that can be applied to the information input/output apparatus of the present invention.

Next, the application of the light emitting/receiving unit 2500 to the coordinate input device 2300 in place of the light emitting/receiving unit 405 will be explained. As shown in FIG. 28, when an indicating unit 2301 has been inserted into a certain position of a coordinate input area 2303, a predetermined beam is retroreflected by a retroreflection member 407 of the indicating unit 2301. This beam reaches a light receiving element 503 (FIG. 24) of the light emitting/receiving unit 2500. As explained above, when the indicating unit 2301 has been inserted into a certain position of a coordinate input area 2303 and a predetermined beam has been retroreflected, a peak appears in the shape of the light intensity distribution of the beam from the light receiving element.

Figure 29:
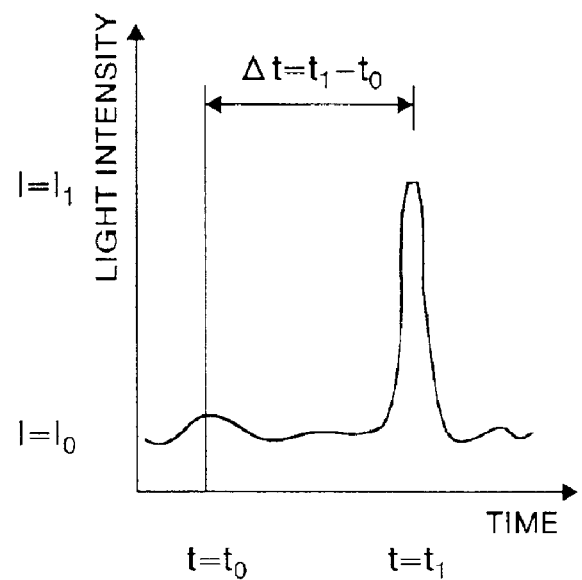
FIG. 29 is still another diagram that explains a structure of a coordinate input device that can be applied to the information input/output apparatus of the present invention.

A method of electrical connection between sections has been known, and therefore, this will not be explained in detail. As shown in FIG. 29, when the indicating unit 2301 has not been inserted into the coordinate input area 2303, the light intensity shows "I=$I_0$". When the indicating unit 2301 has been inserted into the coordinate input area 2303 and the retroreflection beam has reached the light receiving element 503, the light intensity shows "I=$I_1$". A portion where the light intensity is "I=$I_1$" is a peak. In FIG. 29, a time t=$t_0$ shows a reference position of the rotation of the polygon mirror 2503, and this is a point of time when a rotary-scanned beam has reached a predetermined angle.

Therefore, when the light intensity has become "I=$I_1$" at a point of time $t_1$, an emission angle θ of a beam retroreflected by the indicating unit 2301 that has been inserted into the coordinate input area 2303 is calculated as follows.

$$=\omega(t_1-t_0)=\omega\Delta t$$

In other words, emission angles θ (θnL,θnR) of beams retroreflected by the indicating unit 2301 that has been inserted into the coordinate input area 2303 are calculated in the light emitting/receiving unit 2500 that are provided at left and right sides respectively. The coordinates of the position into which the indicating unit 2301 has been inserted are detected according to the trigonometric measuring method based on these emission angles θ (θnL,θnR).

"Image Pick-up System"

Figure 30:
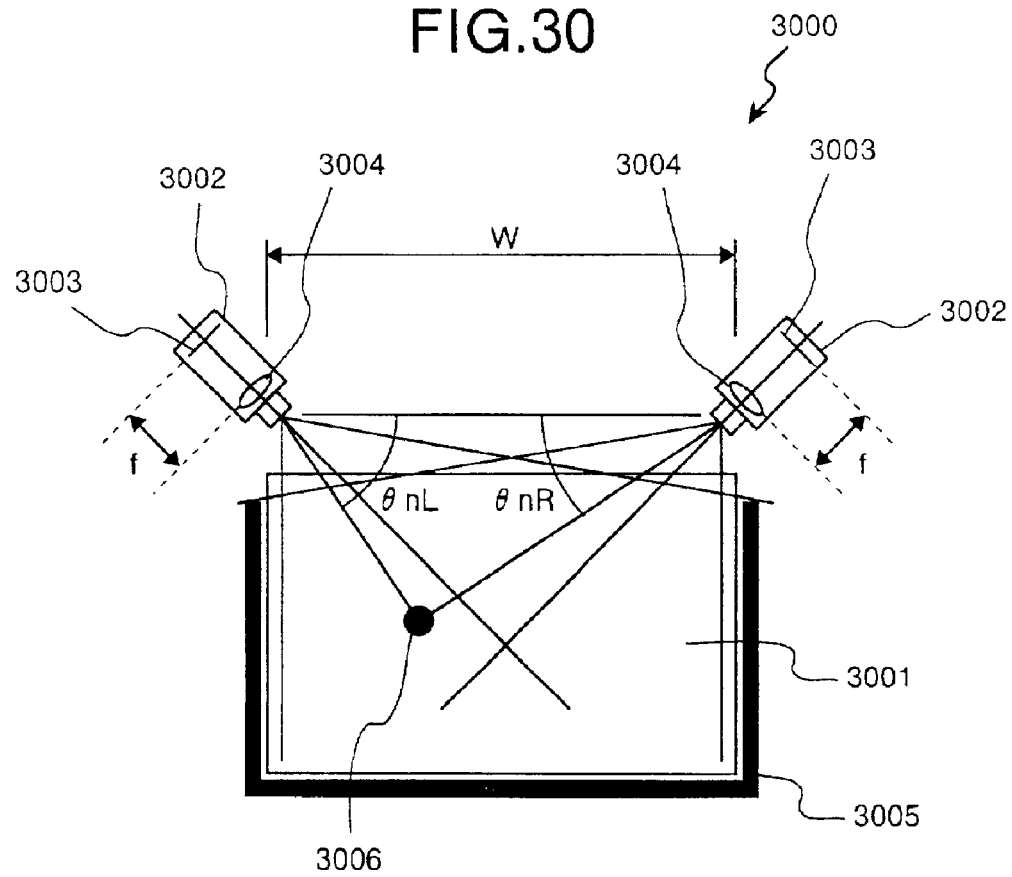
FIG. 30 is still another diagram that explains a structure of a coordinate input device that can be applied to the information input/output apparatus of the present invention.
Figure 31:
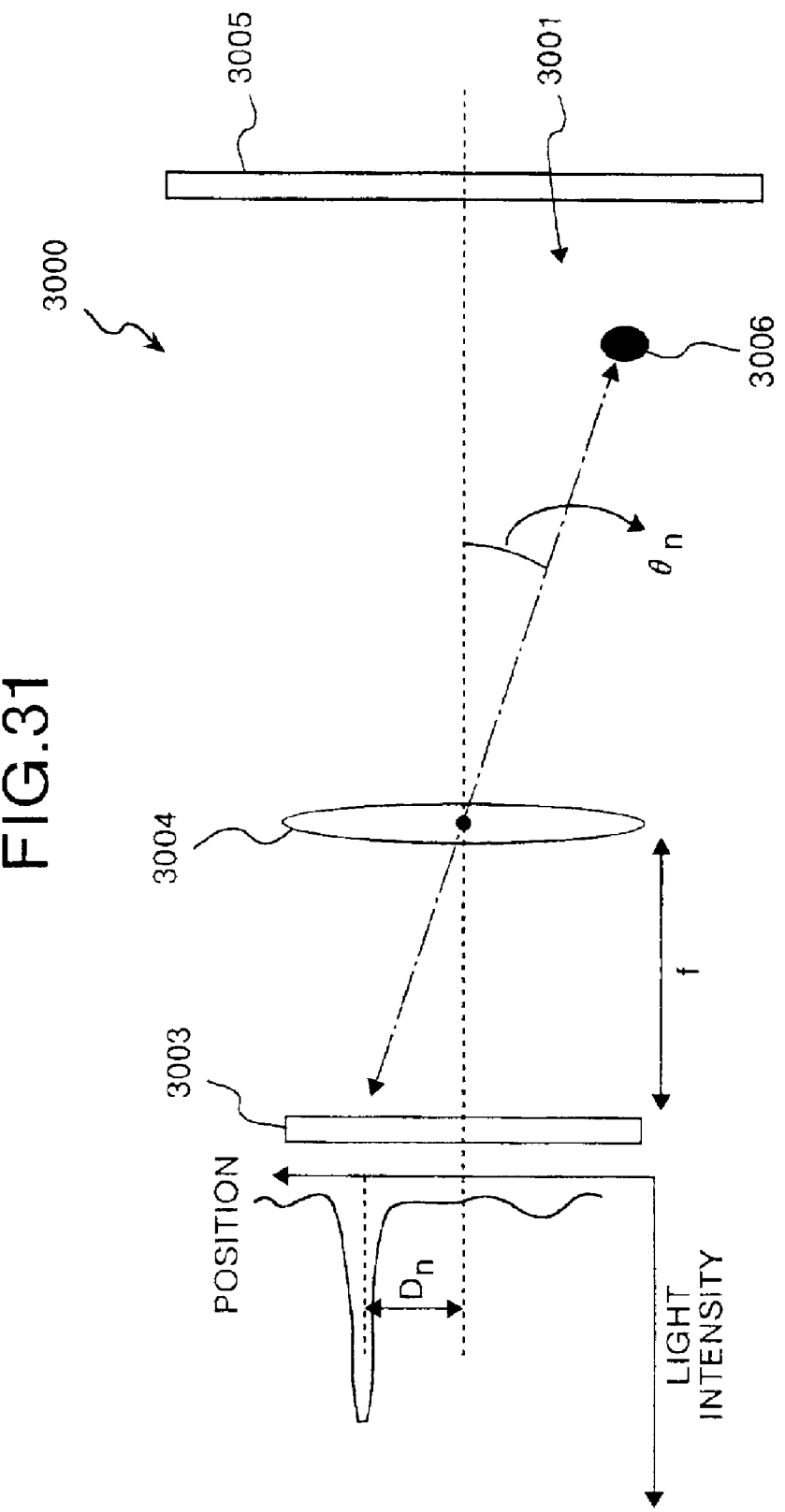
FIG. 31 is still another diagram that explains a structure of a coordinate input device that can be applied to the information input/output apparatus of the present invention.

It is also possible to apply the present invention to an image pick-up type coordinate input device. A structure of the image pick-up type coordinate input device will be explained with reference to FIGS. 30 and 31. In FIGS. 30 and 31, constituent elements similar to those explained above are attached with like reference numerals, and their explanation will be omitted. The coordinate input device explained below is a modification of the coordinate detecting system of the coordinate input device used in the above embodiments. The invention is applied to what is called a camera image pick-up type coordinate input device that takes in image information within a coordinate input area with an image pick-up camera, and detects coordinates of a position based on a part of the image information that has been taken in.

FIG. 30 is a front view that shows a schematic structure of a coordinate input device 3000. Image pick-up cameras 3002 as image pick-up units are provided with a distance w between them, above both upper ends of a coordinate input area 3001 of the coordinate input device 3000. Each image pick-up camera 3002 has a light receiving element 3003 as a CCD and an optical condenser lens 3004 provided, with a distance f between them. An image pick-up angle of each image pick-up camera 3002 is about 90 degrees, and each image pick-up camera 3002 is disposed to take the coordinate input area 3001 as an image pick-up range. Each image pick-up camera 3002 is disposed at a predetermined distance from a display plane 800 that forms a coordinate input plane, and the optical axis is parallel with the display plane 800.

Further, a background plate 3005 is provided at a peripheral portion excluding the upper portion of the coordinate input area 3001 that covers a whole image pick-up area of the image pick-up cameras 3002 without interfering the image pick-up angles. This background plate 3005 is provided approximately in perpendicular to the display plane 800, by facing the plane of the background plate 3005 toward the center of the coordinate input area 3001. This background plate 3005 has a uniform black color, for example.

FIG. 31 shows a relationship between a signal of the image pick-up camera 3002 and an indicating unit 3006. As shown in FIG. 31, when the indicating unit 3006 has been inserted into the coordinate input area 3001, the image pick-up camera 3002 picks up the image of the indicating unit 3006. The image of the indicating unit 3006 is formed on the light receiving element 3003 of the image pick-up camera 3002. When the background plate 3005 has a black color like the coordinate input unit 3000 and when a finger is used as the indicating unit 3006, the indicating unit 3006 has a higher reflectivity than that of the background plate 3005. Therefore, a portion of the light receiving element 3003 corresponding to the indicating unit 3006 becomes an area of strong light intensity (bright point).

A method of electrical connection between sections has been known, and therefore, this will not be explained in detail. As shown in FIG. 31, when the indicating unit 3006 has been inserted into the coordinate input area 3001, a peak appears in the shape of the light intensity distribution from the light receiving element 3003. A position Dn at which this peak appears corresponds to an apparent angle θn of the indicating unit 3006 from the principal point of the optical condenser lens 3004. θn can be expressed as a function of Dn as follows.

$$\theta n = \arctan(Dn/f)$$

In other words, in the camera image pick-up type coordinate input device 3000, it is also possible to calculate the coordinates of the position of the indicating unit 3006 according to trigonometrical measurement based on the peak that appears in the waveform of light intensity, in a similar manner to that of the above coordinate input device. For the indicating unit 3006, it is also possible to use an exclusive pen having a self light-emitting element.

"System According to a Light Emitting/receiving String"

Figure 32:
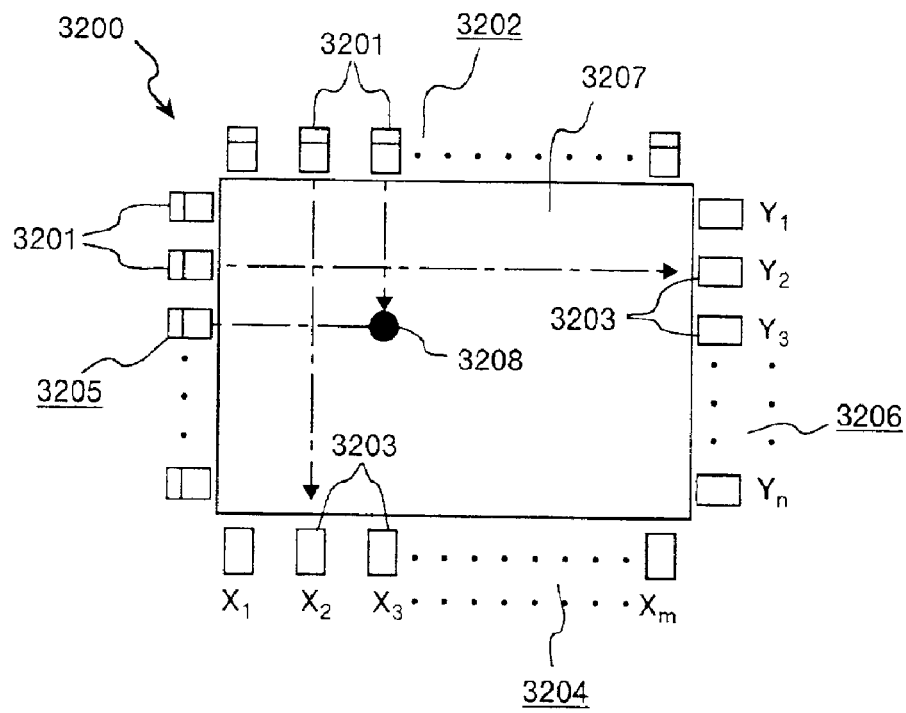
FIG. 32 is still another diagram that explains a structure of a coordinate input device that can be applied to the information input/output apparatus of the present invention.
Figure 33:
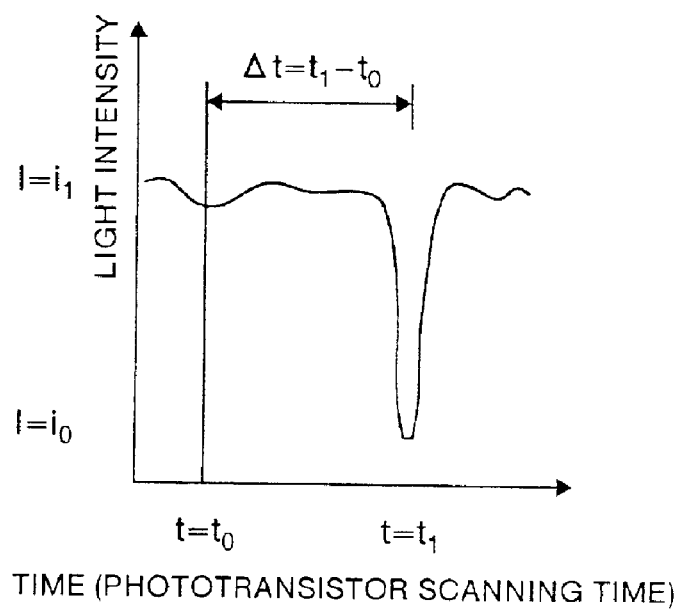
FIG. 33 is still another diagram that explains a structure of a coordinate input device that can be applied to the information input/output apparatus of the present invention.

It is also possible to apply the present invention to a coordinate input device according to a light emitting/receiving string. A structure of the coordinate input device according to the light emitting/receiving string will be explained with reference to FIGS. 32 and 33. In FIGS. 32 and 33, constituent elements similar to those explained above are attached with like reference numerals, and their explanation will be omitted. The coordinate input device explained below is a modification of the coordinate input device used in the above embodiments. The invention is applied to what is called an LED array type coordinate input device that directly detects coordinates of orthogonal two axes without detecting coordinates based on trigonometric measurement.

FIG. 32 is a front view that shows a schematic structure of a coordinate input device 3200. As shown in FIG. 32, the coordinate input device 3200 includes a light emitting element string 3202 having Xm light emitting diodes (LED) 3201 disposed as light emitting units in a horizontal direction at every constant distance, a light receiving element string 3204 having Xm phototransistors 3203 disposed as light receiving units at every constant distance corresponding to the LEDs 3201 at one to one, a light emitting element string 3205 having Yn LEDs 3201 disposed in a vertical direction at every constant distance, and a light receiving element string 3206 having Yn phototransistors 3203 disposed at every constant distance corresponding to the LEDs 3201 at one to one.

A space formed by being encircled by the light emitting element string 3202, the light receiving element string 3204, the light emitting element string 3205, and the light receiving element string 3206 becomes a coordinate input area 3207. In other words, within the coordinate input area 3207, m optical paths that are formed in a horizontal direction and n optical paths that are formed in a vertical direction can mutually cross in a matrix shape. The coordinate input area 3207 is formed in a square shape having a long side in a lateral direction, in sizes corresponding to the sizes of the display plane 800. Characters and graphics can be input by hand into this area.

When an indicating unit 3208 is inserted into a certain position on the coordinate input area 3207, a predetermined optical path is interfered by the indicating unit 3208. Therefore, the light receiving quantity of the phototransistors 3203 in the light receiving element string 3204 and the light receiving quantity of the phototransistors 3203 in the light receiving element string 3206 on this interfered optical path are lowered respectively.

A method of electrical connection between sections has been known, and therefore, this will not be explained in detail. As shown in FIG. 33, when the indicating unit 3208 has not been inserted into the coordinate input area 3207, the light intensity of each phototransistors 3203 shows "$I=i_1$". When the indicating unit 3208 has been inserted into the coordinate input area 3207 and the optical path has been interfered, the light intensity of the phototransistor 3203 on this interfered optical path shows "$I=I_0$". A portion where the light intensity is "$I=i_0$" is a dip. In FIG. 33, the lateral axis corresponds to a position of the phototransistor 3203, and this actually shows a scanning time for sequentially reading light output of the phototransistor 3203.

Then, a dip position corresponding to the position of the phototransistor 3203 in the light receiving element string 3204 and the phototransistor 3203 in the light receiving element string 3206 of which light receiving quantity has been lowered is detected. Based on this, the coordinates of the position indicated by the indicating unit 3208 are calculated. More specifically, a time $t_1$ taken to detect the dip position from a reference position $t=t_0$ and a waveform shown in FIG. 33 are read into the memory. The dip position is detected as a memory address corresponding to the dip position in the data within the memory.

The coordinate input device explained in the present specification is provided in the PDP as a display unit. However, the present invention is not limited to this structure. It is also possible to use a CRT (cathode ray tube), an LCD (liquid crystal display), a forward projection type projector, and a backward projection type projector as display units. Further, the display unit is not limited to these display units. It is also possible to provide the coordinate input device in the blackboard or the whiteboard that functions as a writing board although not particularly shown.

As explained above, according to one aspect of the present invention, the operation of touching two or more points within a predetermined period of time is set as the operation of generating a control signal eigen to the touch type input of coordinates. As a result, there is an effect that it is possible to provide an information input/output apparatus that enables the operator to make a computer execute a display or an erasing of a tool bar at an optional position of the panel, without affecting other programs.

Further, according to another aspect of the present invention, it is possible to prevent simultaneous inputs carried out by a plurality of operators from being erroneously detected as normal simultaneous inputs, of which possibility is high particularly when a large-screen panel is used. As a result, there is an effect that it is possible to provide an information input/output apparatus having a large screen that can be operated more easily.

Further, according to still another aspect of the present invention, a predetermined length is set as a distance between touches on the panel with a finger of one hand, and therefore, it is possible to securely decide whether simultaneous touches have been carried out by one operator or not. Therefore, it is possible to prevent simultaneous inputs carried out by a plurality of operators from being erroneously detected as normal simultaneous inputs, of which possibility is high particularly when a large-screen panel is used. As a result, there is an effect that it is possible to provide an information input/output apparatus having a large screen that can be operated more easily.

Further, according to still another aspect of the present invention, even when there is no button that calls a tool bar on the displayed screen, it is possible to make the tool bar displayed from an optional position on the display screen without changing the displayed screen. As a result, there is an effect that it is possible to provide an information input/output apparatus that can be operated more easily.

Further, according to still another aspect of the present invention, it is possible to make the tool bar displayed in an area on the display screen in which the operator can operate at present. Therefore, the operator can operate the tool bar without moving from the tool-bar displayed position. As a result, there is an effect that it is possible to provide an information input/output apparatus having a large screen that can be operated more easily.

Further, according to still another aspect of the present invention, it is possible to make the tool bar displayed in an area on the display screen in which the operator can operate more securely at present. Therefore, the operator can operate the tool bar without moving from the tool-bar displayed position. As a result, there is an effect that it is possible to provide an information input/output apparatus having a large screen that can be operated more easily.

Further, according to still another aspect of the present invention, it is possible to limit the number of simultaneous touches allocated to the control signal to a number of simultaneous touches that a man can carry out with a hand. As a result, there is an effect that it is possible to provide an information input/output apparatus that can be operated more effectively, by avoiding unnecessary data setting.

Further, according to still another aspect of the present invention, it is possible to prevent simultaneous touches carried out within a set area from being invalidated by touches carried out in other area As a result, there is an effect that it is possible to provide an information input/output apparatus having a large screen that can be operated more easily.

Further, according to still another aspect of the present invention, it is possible to prevent such a malfunction that when only a part of points has been detached, the remaining touch points are erroneously detected as new touch points. As a result, there is an effect that it is possible to provide an information input/output apparatus that can be operated more easily.

Further, according to still another aspect of the present invention, the operation of touching two or more points within a predetermined period of time is set as the operation of generating a control signal eigen to the touch type input of coordinates. As a result, there is an effect that it is possible to provide an information input/output apparatus that enables the operator to make a computer execute a display or an erasing of a tool bar at an optional position of the touch panel, without affecting other programs.

Further, according to still another aspect of the present invention, it is possible to prevent simultaneous inputs carried out by a plurality of operators from being erroneously detected as normal simultaneous inputs, of which possibility is high particularly when a large-screen panel is used. As a result, there is an effect that it is possible to provide an information input/output control method of controlling an information input/output apparatus having a large screen that can be operated more easily.

Further, according to still another aspect of the present invention, a predetermined length is set as a distance between touches on the panel with a finger of one hand, and therefore, it is possible to securely decide whether simultaneous touches have been carried out by one operator or not. Therefore, it is possible to prevent simultaneous inputs carried out by a plurality of operators from being erroneously detected as normal simultaneous inputs, of which possibility is high particularly when a large-screen panel is used. As a result, there is an effect that it is possible to provide an information input/output control method of controlling an information input/output apparatus having a large screen that can be operated more easily.

Further, according to still another aspect of the present invention, even when there is no button that calls a tool bar on the displayed screen, it is possible to make the tool bar displayed from an optional position on the display screen without changing the displayed screen. As a result, there is an effect that it is possible to provide an information input/output control method of being able to be operated more easily.

Further, according to still another aspect of the present invention, it is possible to make the tool bar displayed in an area on the display screen in which the operator can operate at present. Therefore, the operator can operate the tool bar without moving from the tool-bar displayed position. As a result, there is an effect that it is possible to provide an information input/output control method of controlling an information input/output apparatus having a large screen that can be operated more easily.

Further, according to still another aspect of the present invention, it is possible to make the tool bar displayed in an area on the display screen in which the operator can operate more securely at present. Therefore, the operator can operate the tool bar without moving from the tool-bar displayed position. As a result, there is an effect that it is possible to provide an information input/output control method of controlling an information input/output apparatus having a large screen that can be operated more easily.

Further, according to still another aspect of the present invention, it is possible to limit the number of simultaneous touches allocated to the control signal to a number of simultaneous touches that a man can carry out with a hand. As a result, there is an effect that it is possible to provide an information input/output control method of being applied more effectively, by avoiding unnecessary data setting.

Further, according to still another aspect of the present invention, it is possible to prevent simultaneous touches carried out within a set area from being invalidated by touches carried out in other area. As a result, there is an effect that it is possible to provide an information input/output control method of controlling an information input/output apparatus having a large screen that can be operated more easily.

Further, according to still another aspect of the present invention, it is possible to prevent such a malfunction that when only a part of points has been detached, the remaining touch points are erroneously detected as new touch points. As a result, there is an effect that it is possible to provide an information input/output control method of being operated more easily.

Further, according to still another aspect of the present invention, the operation of touching two or more points within a predetermined period of time is set as the operation of generating a control signal eigen to the touch type input of coordinates. As a result, there is an effect that it is possible to provide a computer-readable recording medium recorded with a program for making a computer execute an information input/output control method for the operator to make a computer execute a display or an erasing of a tool bar at an optional position of the touch panel, without affecting other programs.

Further, according to still another aspect of the present invention, the operation of touching two or more points within a predetermined period of time is set as the operation of generating a control signal eigen to the touch type input of coordinates. As a result, there is an effect that it is possible to provide a program for making a computer execute an information input/output control method of enabling the operator to make a computer execute a display or an erasing of a tool bar at an optional position of the touch panel, without affecting other programs.

The present document incorporates by reference the entire contents of Japanese priority documents, 2001-088921 filed in Japan on Mar. 26, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information input/output apparatus, comprising:
a touch panel;
a touch point detecting unit configured to detect at least one point touched on the touch panel;
a distance calculating unit configured to calculate, when the touch point detecting unit detects touches of two or more points on the touch panel, a distance between the detected two or more points; and
a signal generating unit configured to generate a signal according to the at least one point detected by the touch point detecting unit, wherein
the distance calculating unit is configured to calculate (1) a first difference between a maximum value and a minimum value of x coordinates of the two or more detected points, and (2) a second difference between a maximum value and a minimum value of y coordinates of the two or more detected points, based on a result of the touch point detecting unit.

2. An information input/output apparatus, comprising:
a touch panel;
a touch point detecting unit configured to detect at least one point touched on the touch panel;
a distance calculating unit configured to calculate, when the touch point detecting unit detects touches of two or more points on the touch panel, a distance between the detected two or more points; and
a signal generating unit configured to generate a signal according to the at least one point detected by the touch point detecting unit, wherein
when the touch point detecting unit detects that one point has been touched on the touch panel within a predetermined period of time, the signal generating unit is configured to generate a coordinate signal indicating coordinates of the touched point, and when the touch point detecting unit detects that two or more points have been touched on the touch panel within the predetermined period of time, the signal generating unit is configured to generate a control signal indicating a preset control corresponding to the number of touched points;
when the distance calculated by the distance calculating unit is equal to or larger than a predetermined length, the signal generating unit is configured to not generate the control signal; and
the distance calculating unit is configured to calculate (1) a first difference between a maximum value and a minimum value of x coordinates of the two or more detected points, and (2) a second difference between a maximum value and a minimum value of y coordinates of the two or more detected points, based on a result of the touch point detecting unit.

3. The information input/output apparatus according to claim 2, wherein when the control signal is output to a computer that has a display screen, the control signal causes the computer to display a tool bar on the display screen.

4. The information input/output apparatus according to claim 3, further comprising:
a touch candidate point obtaining unit configured to obtain two or more touch candidate points when two or more points have been touched on the touch panel within the predetermined period of time, wherein
the control signal is configured to cause the tool bar to be displayed in an area on the display screen corresponding to an area encircled by straight lines that pass through the touch candidate points.

5. The information input/output apparatus comprising:
a touch panel;
a touch point detecting unit configured to detect at least one point touched on the touch panel;
a distance calculating unit configured to calculate, when the touch point detecting unit detects touches of two or more points on the touch panel, a distance between the detected two or more points; and
a signal generating unit configured to generate a signal according to the at least one point detected by the touch point detecting unit, wherein
when the touch point detecting unit detects that one point has been touched on the touch panel within a predetermined period of time, the signal generating unit is configured to generate a coordinate signal indicating coordinates of the touched point, and when the touch point detecting unit detects that two or more points have been touched on the touch panel within the predetermined period of time, the signal generating unit is configured to generate a control signal indicating a preset control corresponding to the number of touched points;
when the distance calculated by the distance calculating unit is equal to or larger than a predetermined length, the signal generating unit is configured to not generate the control signal; and
the control signal generating unit is configured to not generate the control signal when at least one of the first difference and the second difference is equal to or larger than the predetermined length.

6. An information input/output control method, comprising:
a touch point detecting step of detecting at least one point touched on a touch panel;
a distance calculating step of calculating a distance between touch points based on a detection result, when touches of two or more points on the touch panel have been detected in the touch point detecting step; and,
the distance calculating step calculates (1) a first difference between a maximum value and a minimum value of x coordinates of the two or more detected points, and (2) a second difference between a maximum value and a minimum value of y coordinates of the two or more detected points, based on a result of the touch point detecting step.

7. An information input/output control method, comprising:
a touch point detecting step of detecting at least one point touched on a touch panel;
a distance calculating step of calculating a distance between touch points based on a detection result, when touches of two or more points on the touch panel have been detected in the touch point detecting step; and
a signal generating step of generating a coordinate signal indicating coordinates of a touched point when the touch point detecting step detects one point being touched on the touch panel within a predetermined period of time, wherein the signal generating step comprises generating a control signal indicating a preset control corresponding to a number of touched points when the touch point detecting step detects two or more points being touched on the touch panel within the predetermined period of time,
when the distance calculated by the distance calculating step is equal to or larger than a predetermined length, the signal generating step does not generate the control signal; and the distance calculating step calculates (1) a first difference between a maximum value and a minimum value of x coordinates of the two or more detected points, and (2) a second difference between a maximum value and a minimum value of y coordinates of the two or more detected points, based on a result of the touch point detecting step.

8. The information input/output control method according to claim 7, wherein when the control signal is output to a computer that has a display screen, the control signal causes the computer to display a tool bar on the display screen.

9. The information input/output control method according to claim 8, further comprising:

a touch candidate point obtaining step of obtaining two or more touch candidate points when two or more points have been touched on the touch panel within the predetermined period of time, wherein the control signal causes the tool bar to be displayed in an area on the display screen corresponding to an area encircled by straight lines that pass through the touch candidate points.

10. An information input/output control method, comprising:

a touch point detecting step of detecting at least one point touched on a touch panel;

a distance calculating step of calculating a distance between touch points based on a detection result, when touches of two or more points on the touch panel have been detected in the touch point detecting step; and a signal generating step of generating a coordinate signal indicating coordinates of a touched point when the touch point detecting step detects one point being touched on the touch panel within a predetermined period of time, wherein the signal generating step comprises generating a control signal indicating a preset control corresponding to a number of touched points when the touch point detecting step detects two or more points being touched on the touch panel within the predetermined period of time, and the control signal generating step does not generate the control signal when at least one of the first difference and the second difference is equal to or larger than the predetermined length.

11. A computer-readable recording medium recorded with a program for making a computer execute an information input/output control method, comprising:

a touch point detecting step of detecting at least one point touched on a predetermined area set in advance;

a distance calculating step of calculating a distance between touch points based on a detection result, when touches of two or more points on the touch panel have been detected in the touch point detecting step; and a signal generating step of generating a coordinate signal indicating coordinates of a touched point when the touch point detecting step detects that one point has been touched on the predetermined area within a predetermined period of time, and of generating a control signal indicating a preset control corresponding to a number of touched points when the touch point detecting step detects that two or more points have been touched on the predetermined area within the predetermined period of time, and the distance calculating step calculates (1) a first difference between a maximum value and a minimum value of x coordinates of the two or more detected points, and (2) a second difference between a maximum value and a minimum value of y coordinates of the two or more detected points, based on a result of the touch point detecting step.

12. A program for making a computer execute an information input/output control method, comprising:

a touch point-detecting step of detecting at least one point touched on a touch panel;

a distance calculating step of calculating a distance between touch points based on a detection result, when touches of two or more points on the touch panel have been detected in the touch point detecting step; and a signal generating step of generating a coordinate signal indicating coordinates of a touched point when the touch point detecting step detects that one point has been touched on the touch panel within a predetermined period of time, and of generating a control signal indicating a preset control corresponding to a number of touched points when the touch point detecting step detects that two or more points have been touched on the touch panel within a predetermined period of time, and the distance calculating step calculates (1) a first difference between a maximum value and a minimum value of x coordinates of the two or more detected points, and (2) a second difference between a maximum value and a minimum value of y coordinates of the two or more detected points, based on a result of the touch point detecting step.

13. An information input/output apparatus, comprising:

a touch panel;

a touch point detecting unit configured to detect at least one point touched on the touch panel;

a signal generating unit configured to generate a signal according to the at least one point detected by the touch point detecting unit; and a touch candidate point obtaining unit configured to obtain two or more touch candidate points when two or more points have been touched on the touch panel within the predetermined period of time, wherein when the touch point detecting unit detects that one point has been touched on the touch panel within a predetermined period of time, the signal generating unit is configured to generate a coordinate signal indicating coordinates of the touched point, and when the touch point detecting unit detects that two or more points have been touched on the touch panel within the predetermined period of time, the signal generating unit is configured to generate a control signal indicating a preset control corresponding to the number of touched points;

when the control signal is output to a computer that has a display screen, the control signal causes the computer to display a tool bar on the display screen; and the control signal is configured to cause the tool bar to be displayed on a touch detection point, which is determined based on (1) an average value of a maximum value and a minimum value of x coordinates of the touch candidate points as an x coordinate, and (2) an average value of a maximum value and a minimum value of y coordinates of the touch candidate points as a y coordinate.

14. The information input/output apparatus according to claim 13, wherein the control signal is configured to cause the tool bar to be displayed on points on the display screen corresponding to points that are within a predetermined distance of the touch detection point.

15. An information input/output apparatus according to claim 13, wherein the control signal is generated based on at least one of up to ten touch points.

16. An information input/output apparatus according to claim 13, wherein the signal generating unit is configured to generate the control signal only when the touch point detecting unit detects that two or more points have been touched within a preset area on the touch panel within the predetermined period of time.

17. An information input/output apparatus according to claim 13, wherein when the touch point detecting unit detects that two or more points have been touched on the touch panel within the predetermined period of time, the touch point detecting unit is configured to not detect touches on the touch panel until the touch point detecting unit detects that the detected two or more points are no longer being touched.

18. An information input/output apparatus, comprising:
a touch panel;
a touch point detecting unit configured to detect at least one point touched on the touch panel;
a signal generating unit configured to generate a signal according to the at least one point detected by the touch point detecting unit; and
a touch candidate point obtaining unit configured to obtain two or more touch candidate points when two or more points have been touched on the touch panel within the predetermined period of time, wherein
when the touch point detecting unit detects that one point has been touched on the touch panel within a predetermined period of time, the signal generating unit is configured to generate a coordinate signal indicating coordinates of the touched point, and when the touch point detecting unit detects that two or more points have been touched on the touch panel within the predetermined period of time, the signal generating unit is configured to generate a control signal indicating a preset control corresponding to the number of touched points;
when the control signal is output to a computer that has a display screen, the control signal causes the computer to display a tool bar on the display screen; and
the control signal is configured to cause the tool bar to be displayed in an area on the display screen corresponding to an area encircled by straight lines that pass through the touch candidate points.

19. An information input/output control method, comprising:
a touch point detecting step of detecting at least one point touched on a touch panel;
a signal generating step of generating a coordinate signal indicating coordinates of a touched point when the touch point detecting step detects one point being touched on the touch panel within a predetermined period of time, wherein the signal generating step comprises generating a control signal indicating a pre-set control corresponding to a number of touched points when the touch point detecting step detects two or more points being touched on the touch panel within the predetermined period of time; and a touch candidate point obtaining step of obtaining two or more touch candidate points when two or more points have been touched on the touch panel within the predetermined period of time, wherein when the control signal is output to a computer that has a display screen, the control signal causes the computer to display a tool bar on the display screen; and the control signal is configured to cause the tool bar to be displayed on a touch detection point, which is determined based on (1) an average value of a maximum value and a minimum value of x coordinates of the touch candidate points as an x coordinate, and (2) an average value of a maximum value and a minimum value of y coordinates of the touch candidate points as a y coordinate.

20. The information input/output control method according to claim 19, wherein
the control signal causes the tool bar to be displayed on points on the display screen corresponding to points that are within a predetermined distance of the touch detection point.

21. An information input/output control method according to claim 19, wherein the control signal is generated based on at least one of up to ten touch points.

22. An information input/output control method according to claim 19, wherein the signal generating step generates the control signal only when the touch point detecting step detects that two or more points have been touched within a pre-set area on the touch panel within the predetermined period of time.

23. An information input/output control method according to claim 19, wherein when the touch point detecting step detects that two or more points have been touched on the touch panel within the predetermined period of time, the touch point detecting step does not detect touches on the touch panel until the detected two or more points are no longer being touched.

24. An information input/output control method, comprising:
a touch point detecting step of detecting at least one point touched on a touch panel;
a signal generating step of generating a coordinate signal indicating coordinates of a touched point when the touch point detecting step detects one point being touched on the touch panel within a predetermined period of time, wherein the signal generating step comprises generating a control signal indicating a pre-set control corresponding to a number of touched points when the touch point detecting step detects two or more points being touched on the touch panel within the predetermined period of time; and
a touch candidate point obtaining step of obtaining two or more touch candidate points when two or more points have been touched on the touch panel within the predetermined period of time, wherein
when the control signal is output to a computer that has a display screen, the control signal causes the computer to display a tool bar on the display screen; and
the control signal causes the tool bar to be displayed in an area on the display screen corresponding to an area encircled by straight lines that pass through the touch candidate points.

* * * * *